US011324294B1

(12) United States Patent
Piper et al.

(10) Patent No.: US 11,324,294 B1
(45) Date of Patent: May 10, 2022

(54) CASE FOR PORTABLE ELECTRONIC COMPUTING DEVICE

(71) Applicant: Pioneer Square Brands, Inc., Seattle, WA (US)

(72) Inventors: Brian Lewis Piper, Seattle, WA (US); Emelie Elna Victoria Troedson, Seattle, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 17/514,123

(22) Filed: Oct. 29, 2021

(51) Int. Cl.
*A45C 13/02* (2006.01)
*A45C 5/02* (2006.01)
*A45C 11/00* (2006.01)

(52) U.S. Cl.
CPC ............... *A45C 13/02* (2013.01); *A45C 5/02* (2013.01); *A45C 2011/003* (2013.01); *A45C 2013/025* (2013.01)

(58) Field of Classification Search
CPC .............................................. A45C 2011/003
USPC ............... 361/679; 248/229.2, 918; 211/69.1
See application file for complete search history.

(56) References Cited

U.S. PATENT DOCUMENTS

| | | | | |
|---|---|---|---|---|
| 6,296,409 | B1 * | 10/2001 | Cherry | B43K 23/004 16/430 |
| 9,930,795 | B2 * | 3/2018 | Chang | A45F 5/10 |
| D897,346 | S * | 9/2020 | Claudepierre | D14/440 |
| 2011/0299241 | A1 * | 12/2011 | Chen | G06F 1/1628 361/679.55 |
| 2015/0343831 | A1 * | 12/2015 | Ceruzzi | B43K 23/001 24/304 |
| 2017/0005687 | A1 * | 1/2017 | Nyholm | A45C 13/005 |
| 2017/0097698 | A1 * | 4/2017 | Maeshima | G06F 3/03545 |
| 2019/0212775 | A1 * | 7/2019 | Lalinde | A45F 5/10 |

OTHER PUBLICATIONS https://www.amazon.com/Volin-Crik-Self-Adhesive-Notebooks-Calendars/ (Year: 2018).*

* cited by examiner

*Primary Examiner* — John K Fristoe, Jr.
*Assistant Examiner* — Justin Caudill
(74) *Attorney, Agent, or Firm* — Grandview Law

(57) ABSTRACT

Systems and methods are involved for a self-contained portable electronic computing device and for a stylus-shaped member, the system includes (I) a case for holding at least one portion of the self-contained portable electronic computing device, the case including at least one aperture; (II) a frame assembly including at least one projection, the at least one projection couplable with the at least one aperture of the case; and (III) a flexible tubular member removably couplable with the frame assembly, the flexible tubular member for holding at least one portion of the stylus-shaped member. In addition, other aspects are described in the claims, drawings, and text forming a part of the present disclosure.

16 Claims, 35 Drawing Sheets

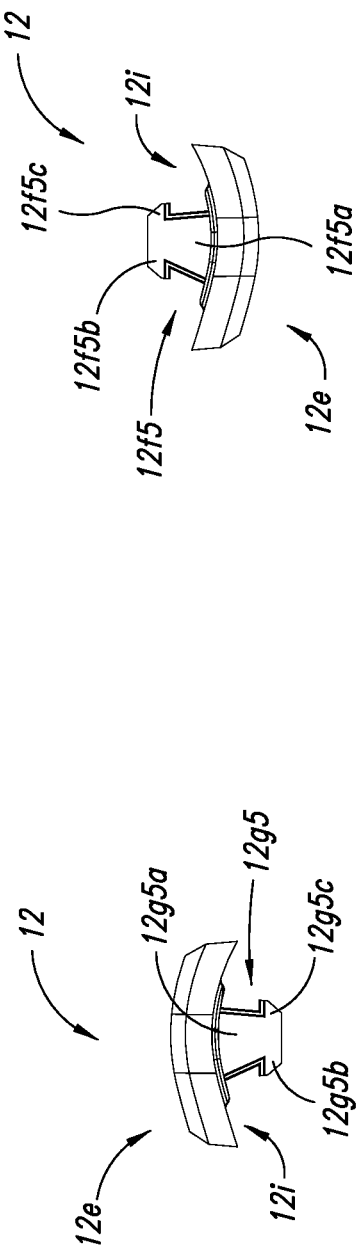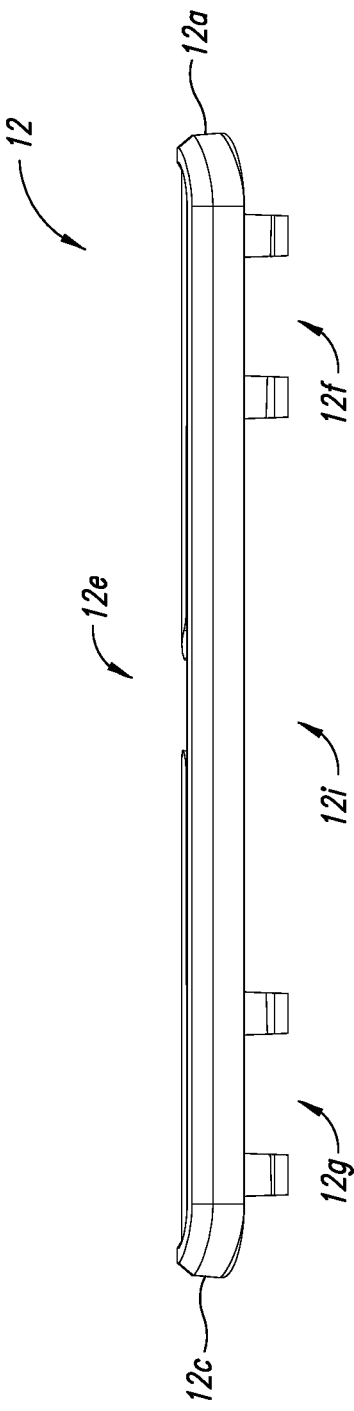

FIG. 20
FIG. 21
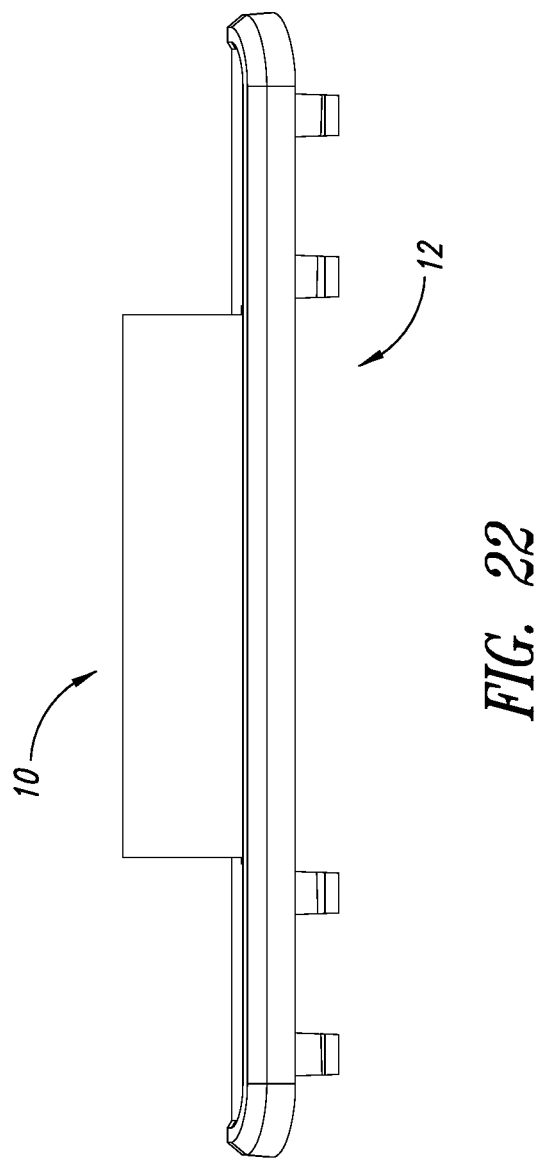
FIG. 22

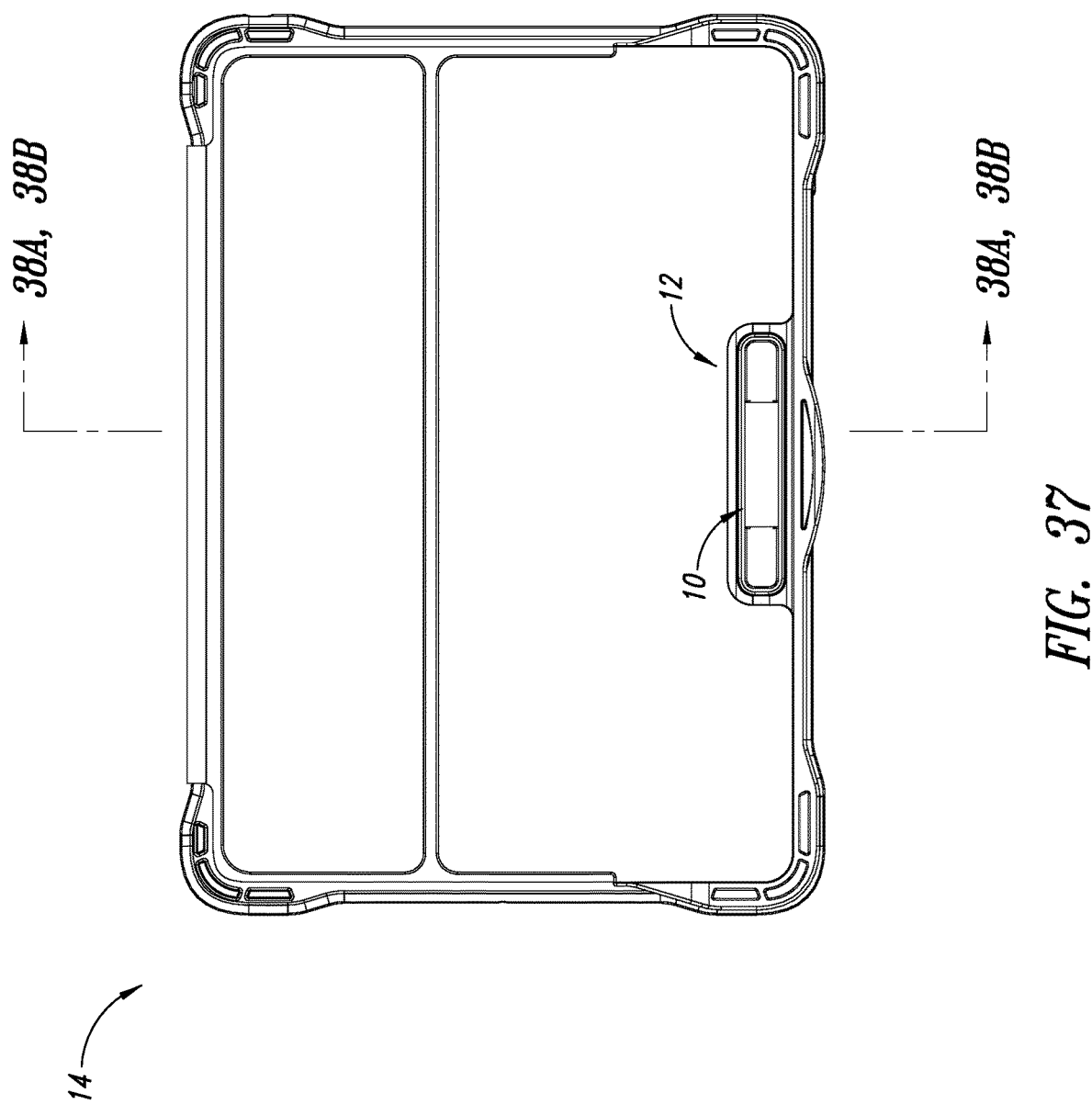

CASE FOR PORTABLE ELECTRONIC COMPUTING DEVICE

SUMMARY

In one or more aspects, a system for a self-contained portable electronic computing device and for a stylus-shaped member, the system including a (I) a case for holding at least one portion of the self-contained portable electronic computing device, the case including at least one aperture; (II) a frame assembly including at least one projection, the at least one projection couplable with the at least one aperture of the case; and (III) a flexible tubular member removably couplable with the frame assembly, the flexible tubular member for holding at least one portion of the stylus-shaped member. Wherein the frame assembly includes at least one elongated member sized to receive at least one portion of the flexible tubular member. Wherein the at least one elongated member includes a cross-sectional profile with a width larger than a thickness. Wherein the at least one elongated member includes first and second elongated members extending toward one another without contacting each other. Wherein the at least one elongated member includes first and second elongated members extending toward one another with a gap therebetween. Wherein the frame assembly includes a first side, a second side and the at least one elongated member includes a first elongated member and a second elongated member, the first side being parallel with the second side, the first elongated member extending from the first side and the second elongated member extending from the second side. Wherein the flexible tubular member includes a semi-circular portion and a semi-rectangular portion. Wherein the flexible tubular member includes at least one curvilinear portion and at least one linear portion. Wherein (A) the at least one curvilinear portion of the flexible tubular member includes a first end and a second end, (B) the at least one linear portion of the flexible tubular member includes a first side portion, a second side portion, and a third side portion, (C) the first side portion extending from the first end of the at least one curvilinear portion, (D) the second side portion extending from the second end of the at least one curvilinear portion, (E) the first side portion being generally parallel with the second side portion, and (F) the third side portion extending between the first side portion and the second side portion. Wherein (A) the at least one elongated member includes a dimensional width, and (B) the third side portion of the at least one linear portion of the configurable cross-sectional profile of the flexible tubular member being sized according to the dimensional width of the at least one elongated member. Wherein (A) the frame assembly being coupled to the case for the portable electronic computing device, (B) a first portion of the at least one linear portion of the flexible tubular member including an external surface portion and an internal surface portion, (C) the external surface portion of the first portion of the at least one linear portion being in contact with a portion of the case for the portable electronic computing device, and (D) the internal surface portion of the first portion of the at least one linear portion being in contact with the at least one elongated member of the frame assembly. Wherein the flexible tubular member includes a length dimension being a first length when a first compressive force on the flexible tubular member along the length dimension is present and being a second length when compressive force on the flexible tubular member along the length dimension is absent, the second length being greater than the first length. Wherein the flexible tubular member includes a diameter dimension being a first length when a first expansive force on the flexible tubular member along the diameter dimension is present and being a second length when expansive force on the flexible tubular member along the diameter dimension is absent, the first length being greater than the second length. Wherein the flexible tubular member being made from at least one of the following: at least one polyester material, at least one nylon material, at least one silicone material, and at least one elasticized material. Wherein the frame assembly being made from at least one of the following: at least one polycarbonate (PC) material, at least one polypropylene (PP) material, and at least one polyethylene (PET) material.

In one or more aspects, a system can include a frame assembly for coupling with a case for a self-contained portable electronic computing device, the case including at least one aperture, and for coupling with a flexible tubular member, the frame assembly including (I) at least one projection couplable with the at least one aperture of the case; (II) a first side; (III) a second side parallel with the first side; (IV) a first elongated member for coupling with the flexible tubular member, the first elongated member extending from the first side toward the second side; and (V) a second elongated member for coupling with the flexible tubular member, the first elongated member extending from the second side toward the first side, wherein the first elongated member and the second elongated member being spaced from each other. Wherein the first elongated member includes a cross-sectional profile with a width larger than a thickness.

In one or more aspects, a system can include a tubular member for coupling with a frame member and for coupling with a stylus-shaped member, the tubular member including (A) at least one curvilinear portion including a first end and second end; (B) at least one linear portion including a first side portion, a second side portion, and a third side portion, wherein (C) the first side portion extending from the first end of the at least one curvilinear portion, (D) the second side portion extending from the second end of the at least one curvilinear portion, (E) the first side portion being generally parallel with the second side portion, and (F) the third side portion extending between the first side portion and the second side portion. Wherein the tubular member including a length dimension being a first length when a first compressive force on the tubular member along the length dimension is present and being a second length when compressive force on the tubular member along the length dimension is absent, the second length being greater than the first length. Wherein the tubular member including a diameter dimension being a first length when a first expansive force on the flexible tubular member along the diameter dimension is present and being a second length when expansive force on the flexible tubular member along the diameter dimension is absent, the first length being greater than the second length.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of a case for portable electronic computing device systems, articles of manufacture, compositions of matter for same that may provide context, for instance, in introducing one or more processes and/or devices described herein.

FIG. 11 is an elevational view of a first end of the frame assembly of FIG. 7.

FIG. 12 is an elevational view of a second end of the frame assembly of FIG. 7.

FIG. 13 is a side-elevational view of the frame assembly of FIG. 7.

FIG. 20 is an elevational view of a first end of tubular member of FIG. 1 being coupled with the frame assembly of FIG. 7.

FIG. 21 is an elevational view of a second end of tubular member of FIG. 1 being coupled with the frame assembly of FIG. 7.

FIG. 22 is a side-elevational view of tubular member of FIG. 1 being coupled with the frame assembly of FIG. 7.

FIG. 37 is a top plan view of tubular member of FIG. 1 coupled with the frame assembly of FIG. 7 and coupled with a case for a self-contained portable electronic computing device.

DETAILED DESCRIPTION

Figure 1:
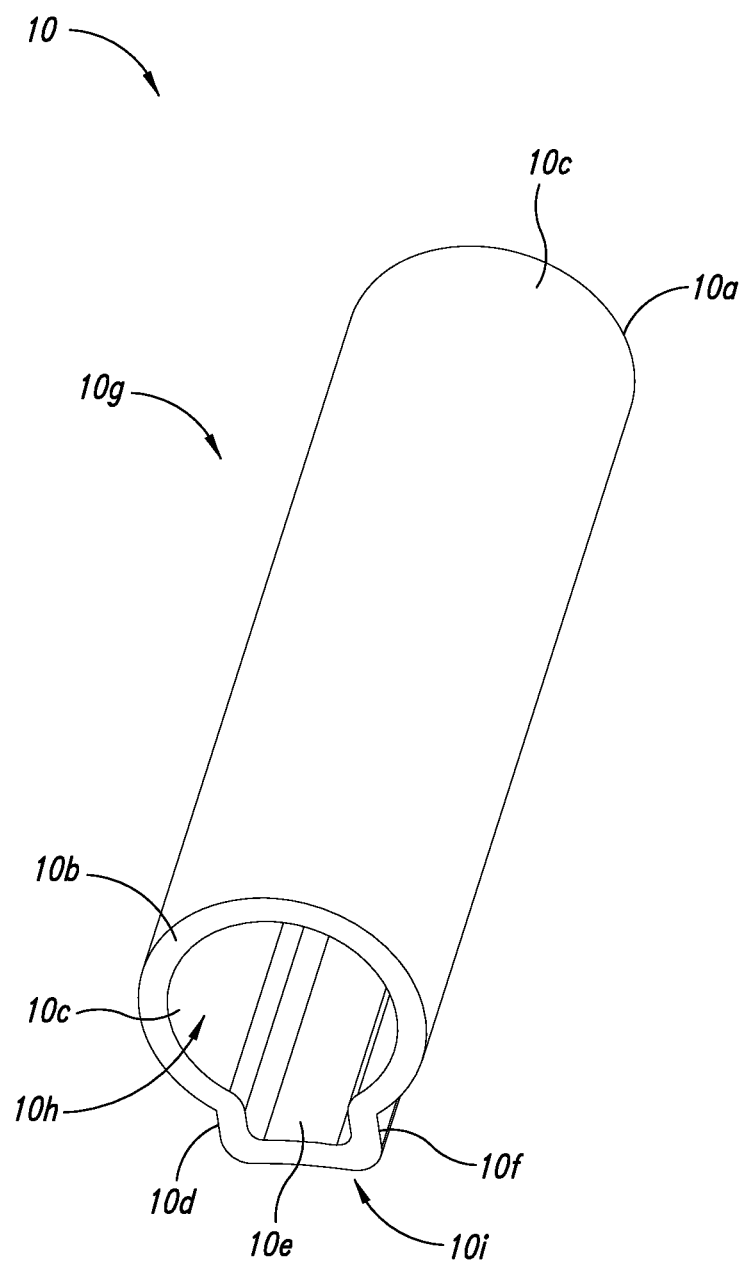
FIG. 1 is an anterior perspective view of a tubular member.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an anterior perspective view of tubular member 10. In implementations, tubular member 10 is shown to include end 10a, end 10b, curvilinear portion 10c, exterior 10g, interior 10h, and linear portion 10i. In implementations, linear portion 10i is shown to include side 10d, side 10e, and side 10f.

Figure 2:
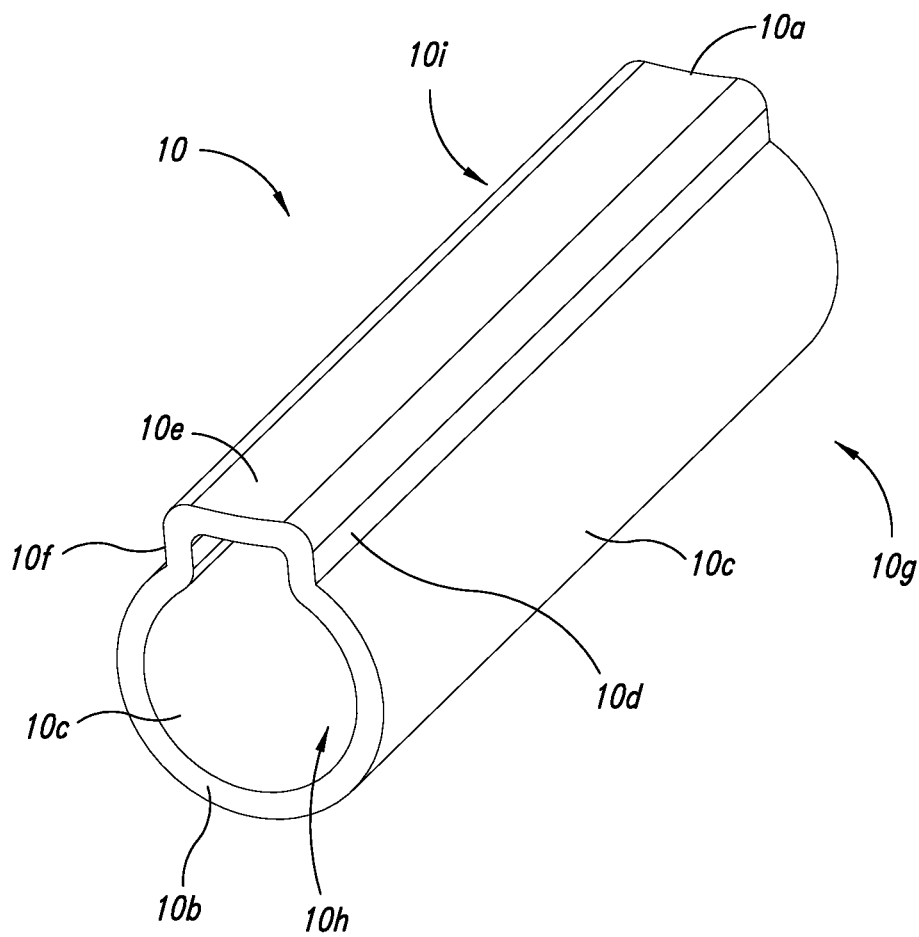
FIG. 2 is a posterior perspective view of tubular member of FIG. 1.

Turning to FIG. 2, depicted therein is a posterior perspective view of tubular member 10.

Figure 3:
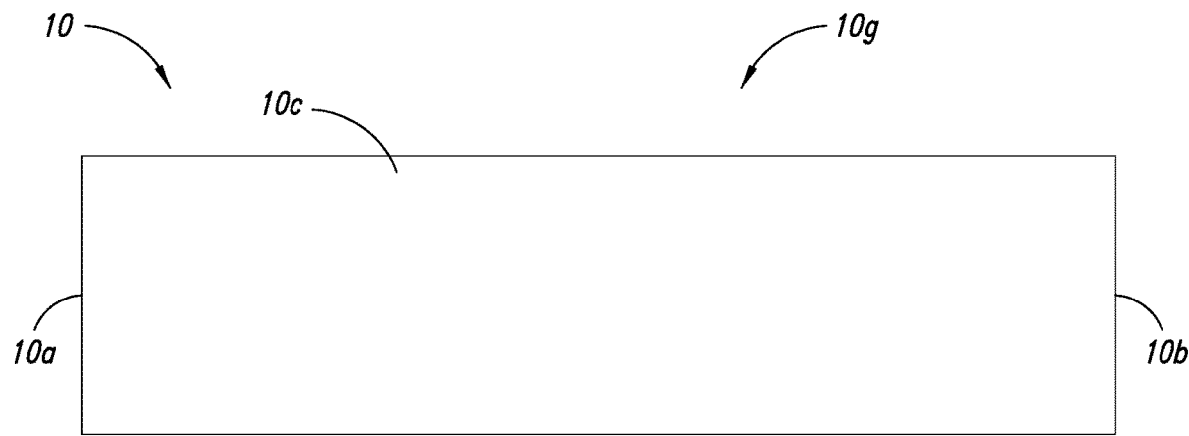
FIG. 3 is a top plan view of tubular member of FIG. 1.

Turning to FIG. 3, depicted therein is a top plan view of tubular member 10.

Figure 4:
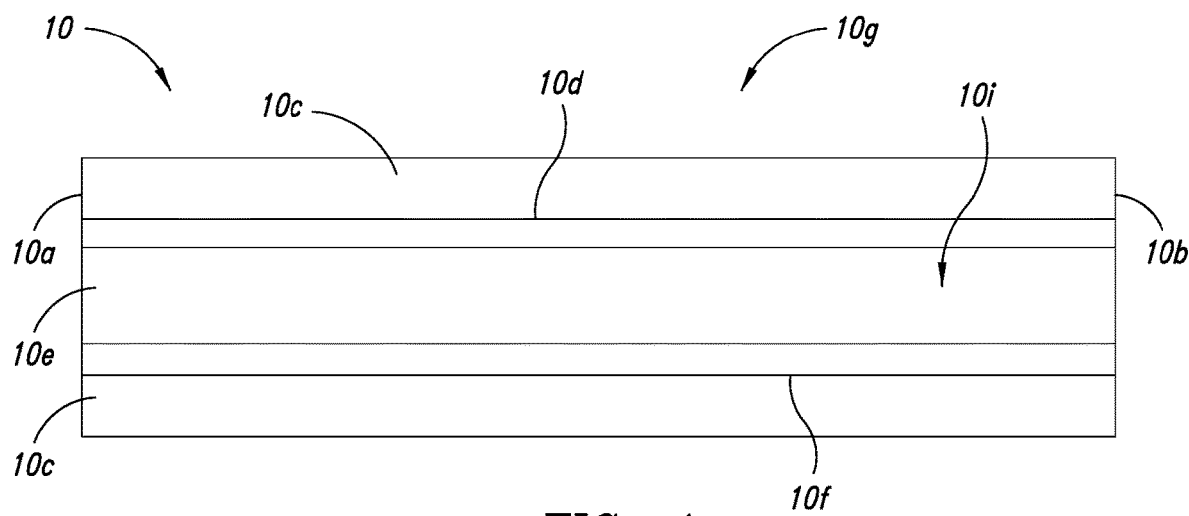
FIG. 4 is a bottom plan view of tubular member of FIG. 1.

Turning to FIG. 4, depicted therein is a bottom plan view of tubular member 10.

Figure 5:
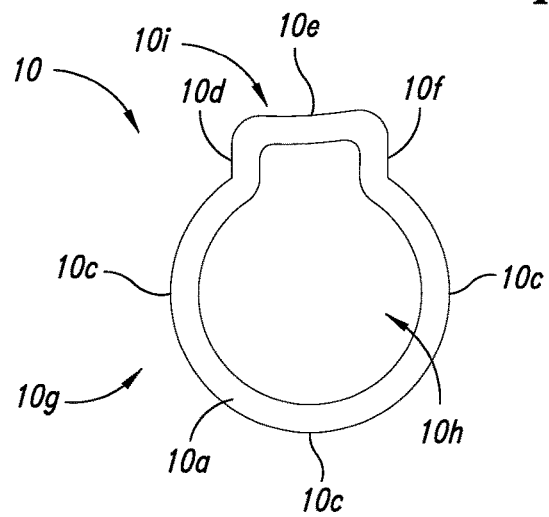
FIG. 5 is an elevational view of a first end of tubular member of FIG. 1.

Turning to FIG. 5, depicted therein is an elevational view of end 10a of tubular member 10.

Figure 6:
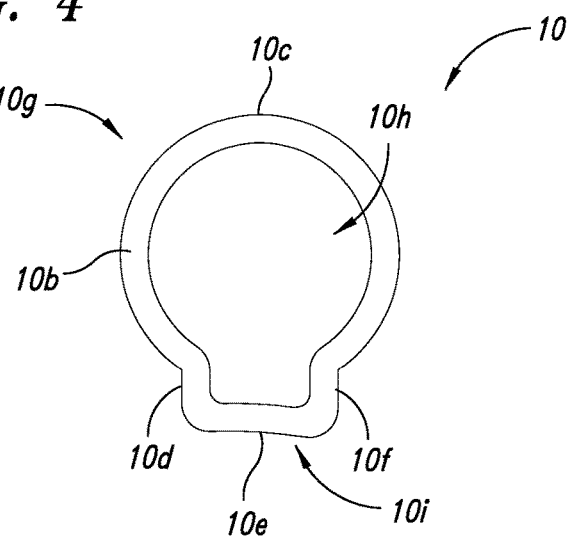
FIG. 6 is an elevational view of a second end of tubular member of FIG. 1.

Turning to FIG. 6, depicted therein is an elevational view of end 10b of tubular member 10.

Figure 7:
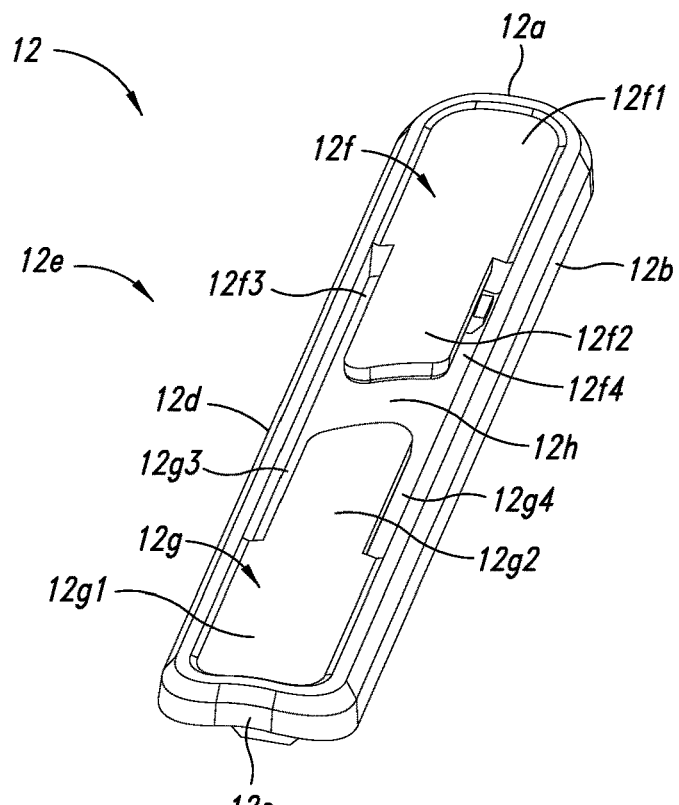
FIG. 7 is an anterior perspective view of a frame assembly.

Turning to FIG. 7, depicted therein is an anterior perspective view of frame assembly 12. In implementations, frame assembly 12 is shown to include end 12a, side 12b, end 12c, side 12d, exterior 12e, engagement portion 12f, engagement portion 12g, and gap 12h. In implementations, engagement portion 12f is shown to include base 12f1, elongated member 12f2, gap 12f3, and gap 12f4. In implementations, engagement portion 12g is shown to include base 12g1, elongated member 12g2, gap 12g3, and gap 12g4.

Figure 8:
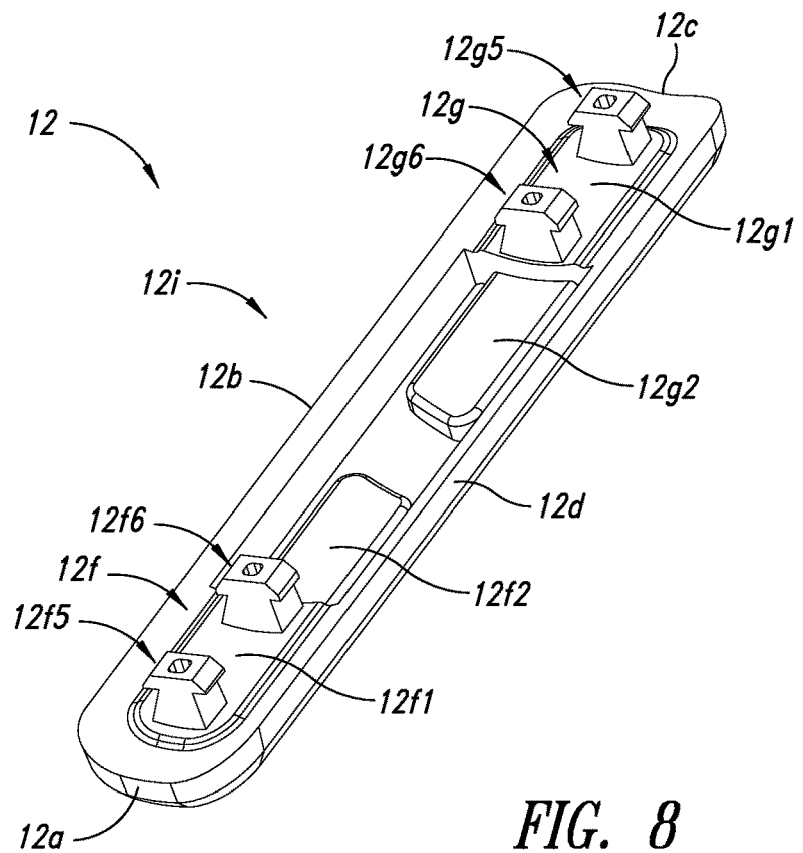
FIG. 8 is a posterior perspective view of the frame assembly of FIG. 7.

Turning to FIG. 8, depicted therein is a posterior perspective view of frame assembly 12. In implementations, engagement portion 12f is shown to include projection 12f5, and projection 12f6. In implementations, engagement portion 12g is shown to include projection 12g5, and projection 12g6.

Figure 9:
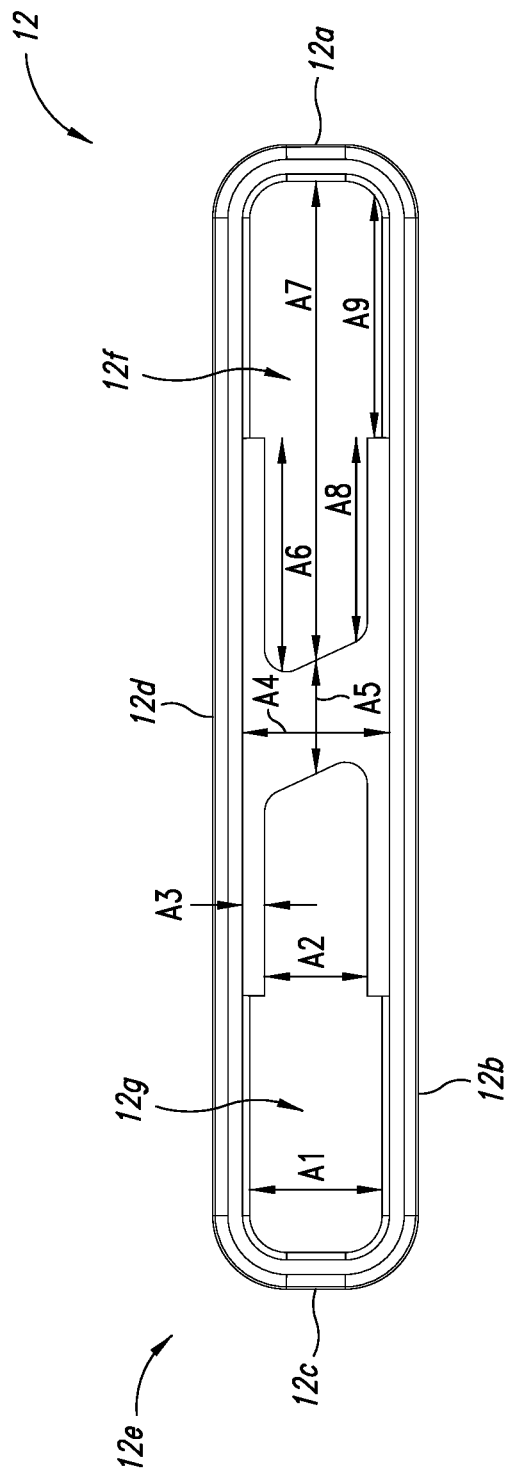
FIG. 9 is a top plan view of the frame assembly of FIG. 7.

Turning to FIG. 9, depicted therein is a top plan view of frame assembly 12. In implementations, frame assembly 12 is shown to include linear dimension A1, linear dimension A2, linear dimension A3, linear dimension A4, linear dimension A5, linear dimension A6, linear dimension A7, linear dimension A8, and linear dimension A9.

Figure 10:
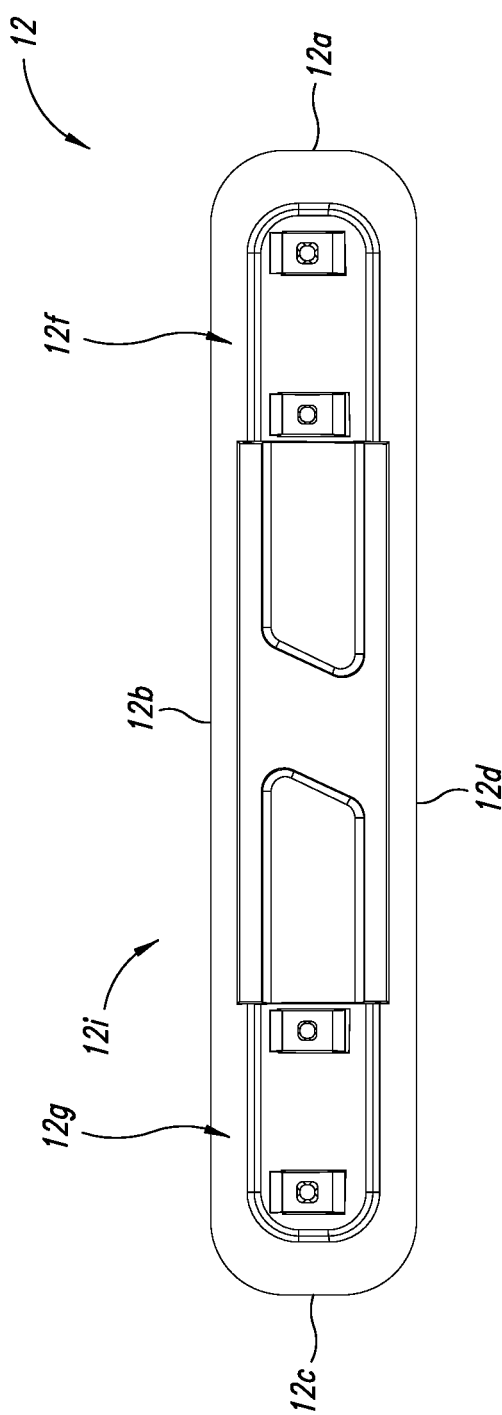
FIG. 10 is a bottom plan view of the frame assembly of FIG. 7.

Turning to FIG. 10, depicted therein is a bottom plan view of frame assembly 12.

Turning to FIG. 11, depicted therein is an elevational view of end 12c of frame assembly 12. In implementations, projection 12g5 is shown to include stem 12g5a, barb 12g5b, and barb 12g5b.

Turning to FIG. 12, depicted therein is an elevational view of end 12a of frame assembly 12. In implementations, projection 12f5 is shown to include stem 12f5a, barb 12g5b, and barb 12g5c.

Turning to FIG. 13, depicted therein is a side-elevational view of frame assembly 12.

Figure 14A:
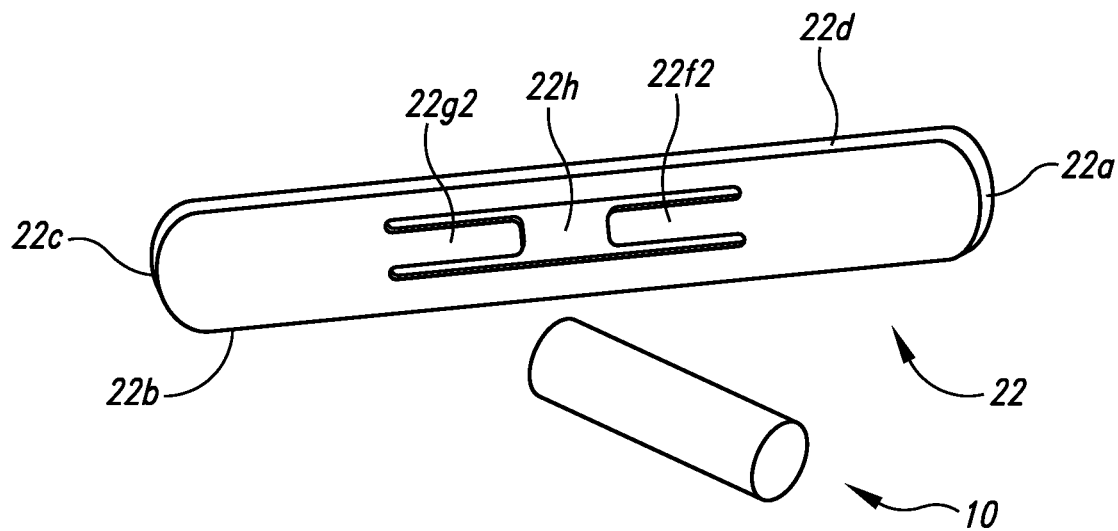
FIG. 14A is a top plan view of tubular member of FIG. 1 and a frame assembly prior to coupling of the tubular member with the frame assembly.

Turning to FIG. 14A, depicted therein is a top plan view of tubular member 10 and frame assembly 22 prior to coupling of tubular member 10 with frame assembly 22. In implementations, frame assembly 22 is shown to include end 22a, side 22b, end 22c, side 22d, elongated member 22f2, elongated member 22g2, and gap 22h.

Figure 14B:
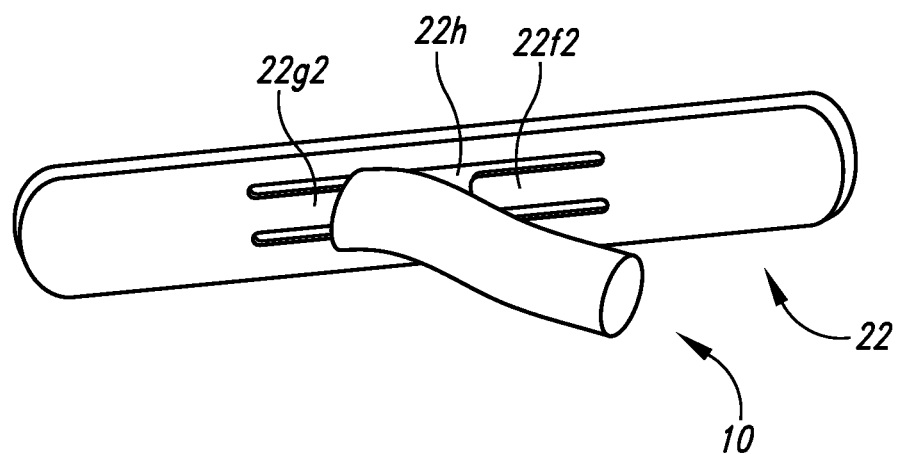
FIG. 14B is a top plan view of tubular member of FIG. 1 and frame assembly of FIG. 14A with the tubular member in initial stages of being coupled with a first elongated member of the frame assembly.

Turning to FIG. 14B, depicted therein is a top plan view of tubular member 10 and frame assembly 22 with tubular member 10 in initial stages of being coupled with elongated member 22g2 of frame assembly 22.

Figure 14C:
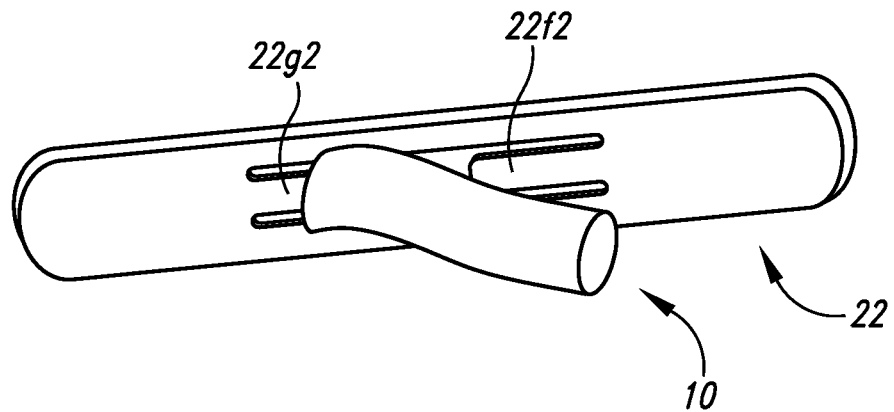
FIG. 14C is a top plan view of tubular member of FIG. 1 and frame assembly of FIG. 14A with the tubular member in initial stages of being coupled with first elongated member of the frame assembly.

Turning to FIG. 14C, depicted therein is a top plan view of tubular member 10 and frame assembly 22 with tubular member 10 in initial stages of being coupled with elongated member 22g2 of frame assembly 22.

Figure 14D:
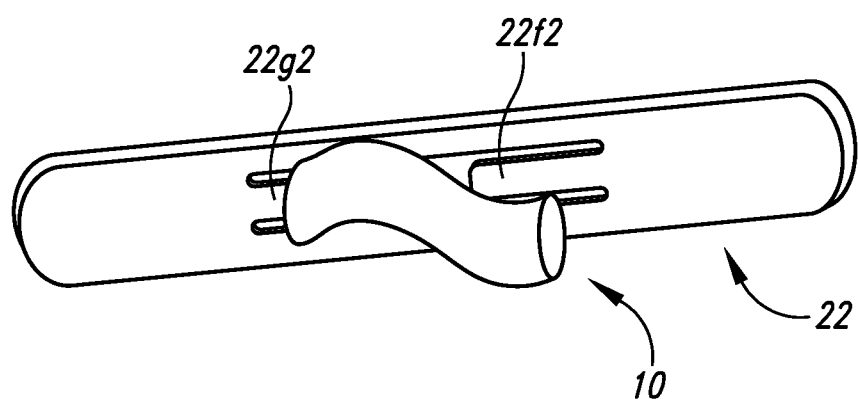
FIG. 14D is a top plan view of tubular member of FIG. 1 and frame assembly of FIG. 14A with the tubular member further being coupled to first elongated member of the frame assembly.

Turning to FIG. 14D, depicted therein is a top plan view of tubular member 10 and frame assembly 22 with tubular member 10 further being coupled to elongated member 22g2 of frame assembly 22.

Figure 14E:
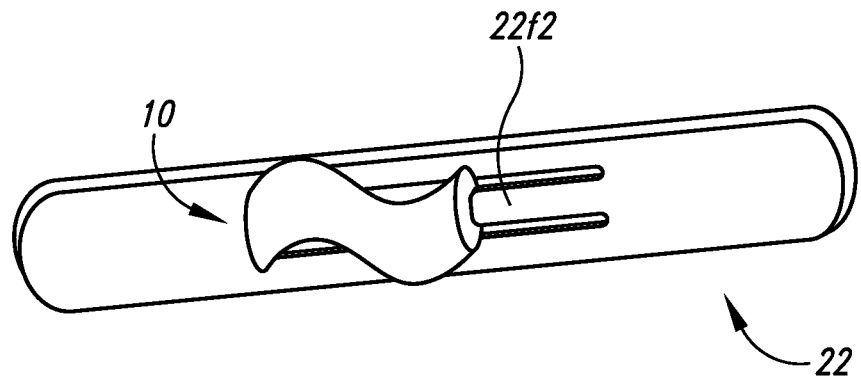
FIG. 14E is a top plan view of tubular member of FIG. 1 and frame assembly of FIG. 14A with the tubular member coupled with first elongated member and being coupled to a second elongated member of the frame assembly.

Turning to FIG. 14E, depicted therein is a top plan view of tubular member 10 and frame assembly 22 with tubular member 10 coupled with elongated member 22g2 and being coupled to elongated member 22f2 of frame assembly 22.

Figure 14F:
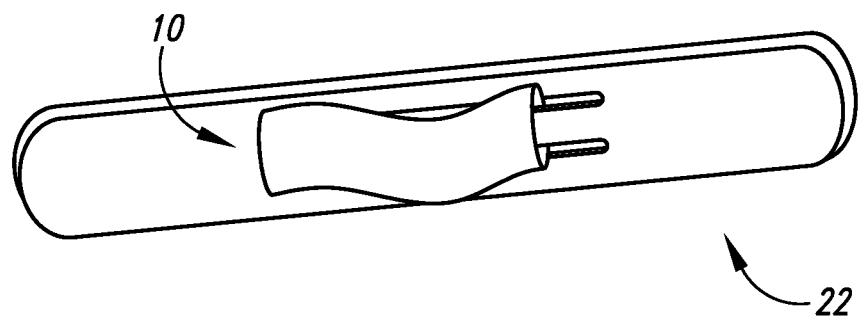
FIG. 14F is a top plan view of tubular member of FIG. 1 and frame assembly of FIG. 14A with the tubular member coupled with first elongated member and further being coupled to a second elongated member of the frame assembly.

Turning to FIG. 14F, depicted therein is a top plan view of tubular member 10 and frame assembly 22 with tubular member 10 coupled with elongated member 22g2 and further being coupled to elongated member 22f2 of frame assembly 22.

Figure 14G:
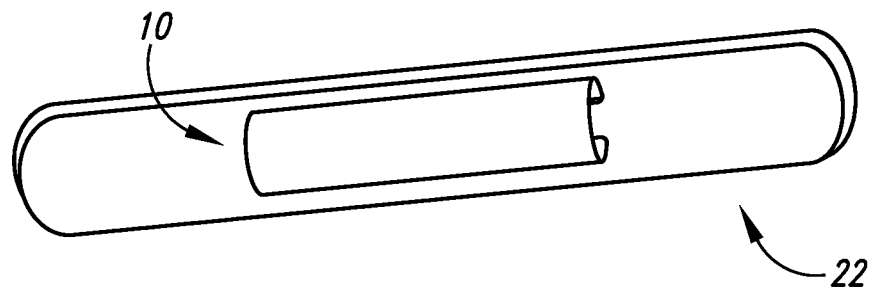
FIG. 14G is a top plan view of tubular member of FIG. 1 and frame assembly of FIG. 14A with the tubular member coupled with first elongated member and coupled to a second elongated member of the frame assembly.

Turning to FIG. 14G, depicted therein is a top plan view of tubular member 10 and frame assembly 22 with tubular member 10 coupled with elongated member 22g2 and coupled to elongated member 22f2 of frame assembly 22.

Figure 14H:
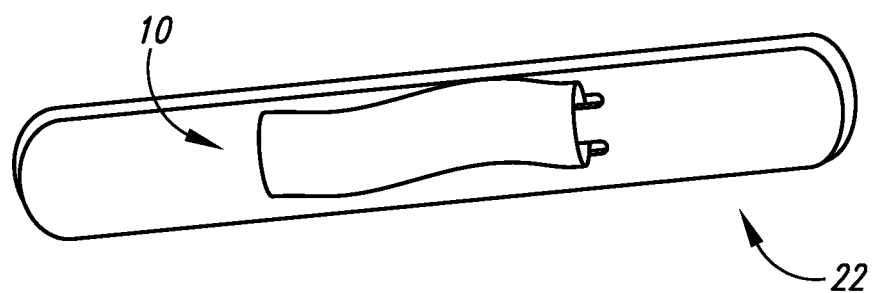
FIG. 14H is a top plan view of tubular member of FIG. 1 further being positioned on frame assembly of FIG. 14A with the tubular member coupled with first elongated member and coupled to a second elongated member of the frame assembly.

Turning to FIG. 14H, depicted therein is a top plan view of tubular member 10 further being positioned on frame assembly 22 with tubular member 10 coupled with elongated member 22g2 and coupled to elongated member 22f2 of frame assembly 22.

Figure 15A:
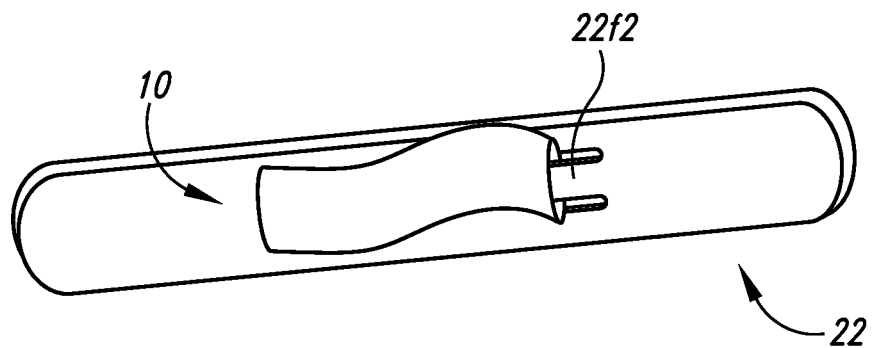
FIG. 15A is a top plan view of tubular member of FIG. 1 initially being uncoupled from the second elongated member of frame assembly of FIG. 14A.

Turning to FIG. 15A, depicted therein is a top plan view of tubular member 10 initially being uncoupled from elongated member 22f2 of frame assembly 22.

Figure 15B:
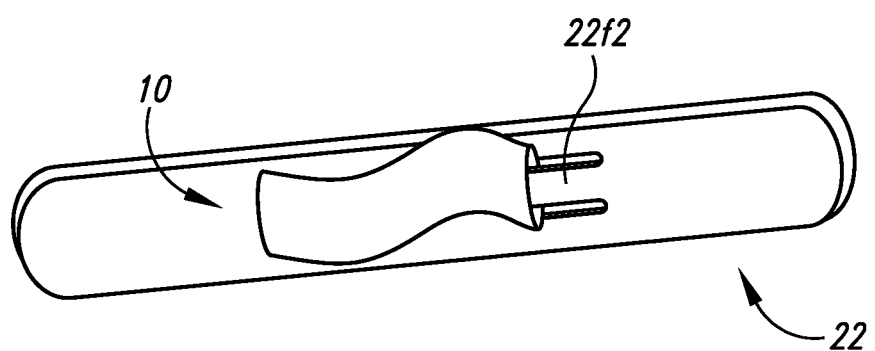
FIG. 15B is a top plan view of tubular member of FIG. 1 further being uncoupled from the second elongated member of frame assembly of FIG. 14A.

Turning to FIG. 15B, depicted therein is a top plan view of tubular member 10 further being uncoupled from elongated member 22f2 of frame assembly 22.

Figure 15C:
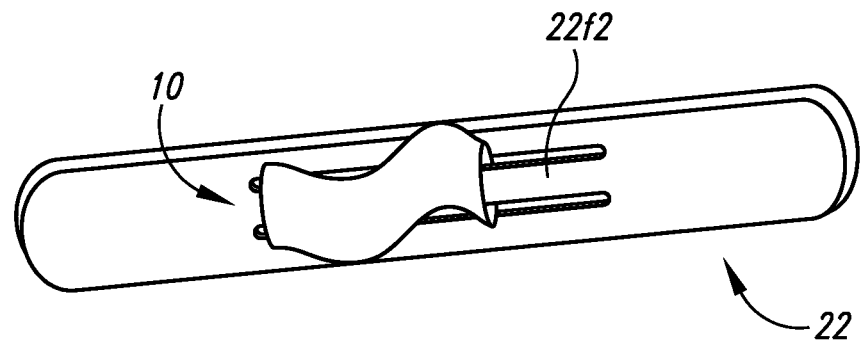
FIG. 15C is a top plan view of tubular member of FIG. 1 still further being uncoupled from the second elongated member of frame assembly of FIG. 14A.

Turning to FIG. 15C, depicted therein is a top plan view of tubular member 10 still further being uncoupled from elongated member 22f2 of frame assembly 22.

Figure 15D:
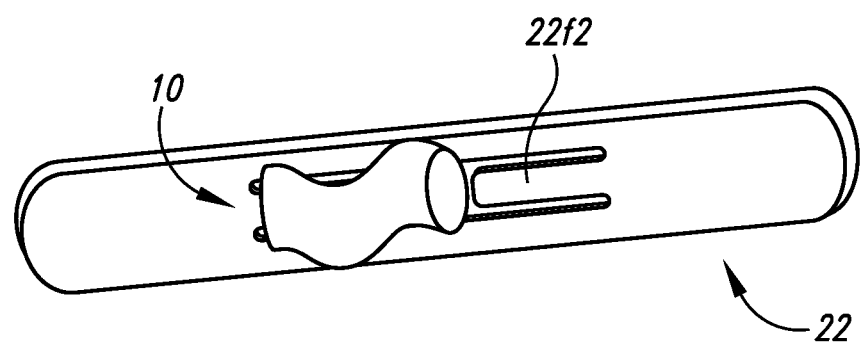
FIG. 15D is a top plan view of tubular member of FIG. 1 being cleared from the second elongated member after being uncoupled from the second elongated member of frame assembly of FIG. 14A.

Turning to FIG. 15D, depicted therein is a top plan view of tubular member 10 being cleared from elongated member 22f2 after being uncoupled from elongated member 22f2 of frame assembly 22.

Figure 15E:
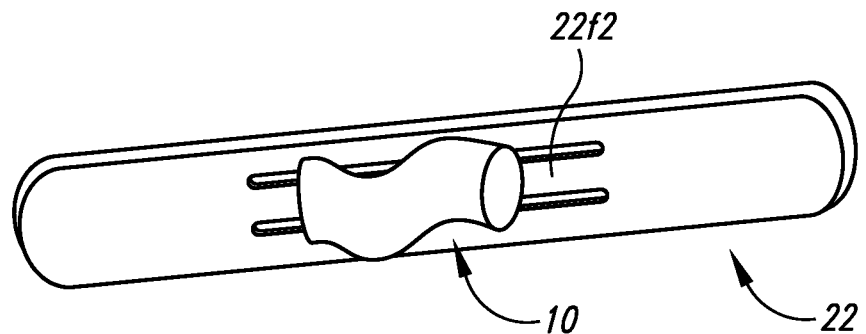
FIG. 15E is a top plan view of tubular member of FIG. 1 initially being uncoupled from first elongated member of frame assembly of FIG. 14A.

Turning to FIG. 15E, depicted therein is a top plan view of tubular member 10 initially being uncoupled from elongated member 22g2 of frame assembly 22.

Figure 15F:
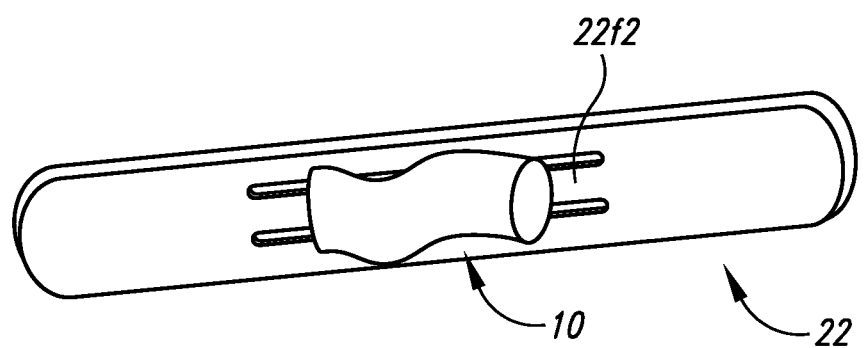
FIG. 15F is a top plan view of tubular member of FIG. 1 further being uncoupled from first elongated member of frame assembly of FIG. 14A.

Turning to FIG. 15F, depicted therein is a top plan view of tubular member 10 further being uncoupled from elongated member 22g2 of frame assembly 22.

Figure 15G:
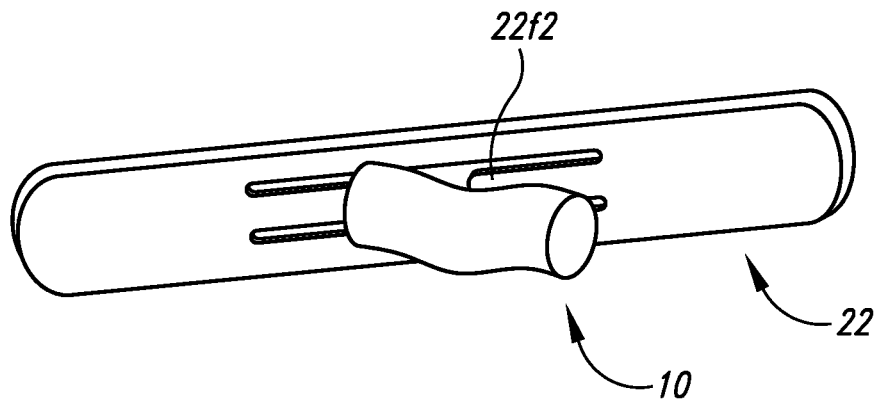
FIG. 15G is a top plan view of tubular member of FIG. 1 still further being uncoupled from first elongated member of frame assembly of FIG. 14A.

Turning to FIG. 15G, depicted therein is a top plan view of tubular member 10 still further being uncoupled from elongated member 22g2 of frame assembly 22.

Figure 15H:
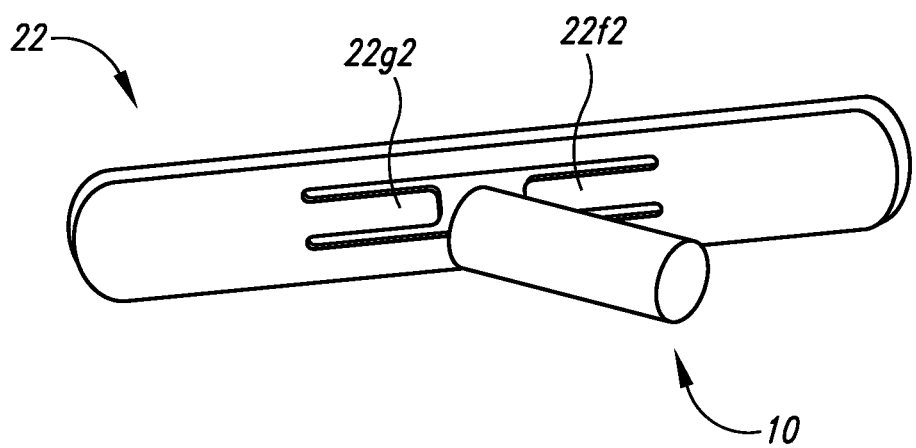
FIG. 15H is a top plan view of tubular member of FIG. 1 being cleared from first elongated member of frame assembly of FIG. 14A.

Turning to FIG. 15H, depicted therein is a top plan view of tubular member 10 being cleared from elongated member 22g2 of frame assembly 22.

Figure 15I:
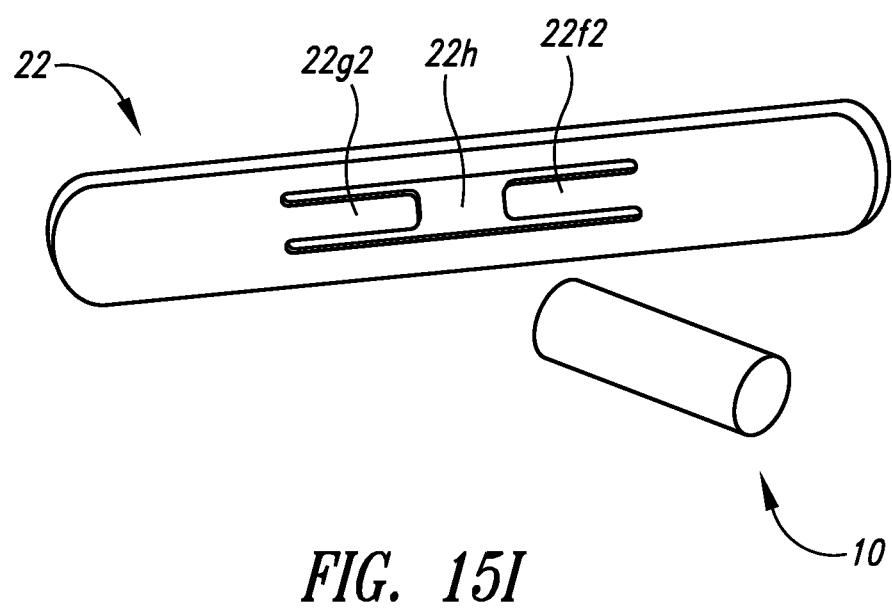
FIG. 15I is a top plan view of tubular member of FIG. 1 having been fully uncoupled from frame assembly of FIG. 14A.

Turning to FIG. 15I, depicted therein is a top plan view of tubular member 10 having been fully uncoupled from frame assembly 22.

Figure 16:
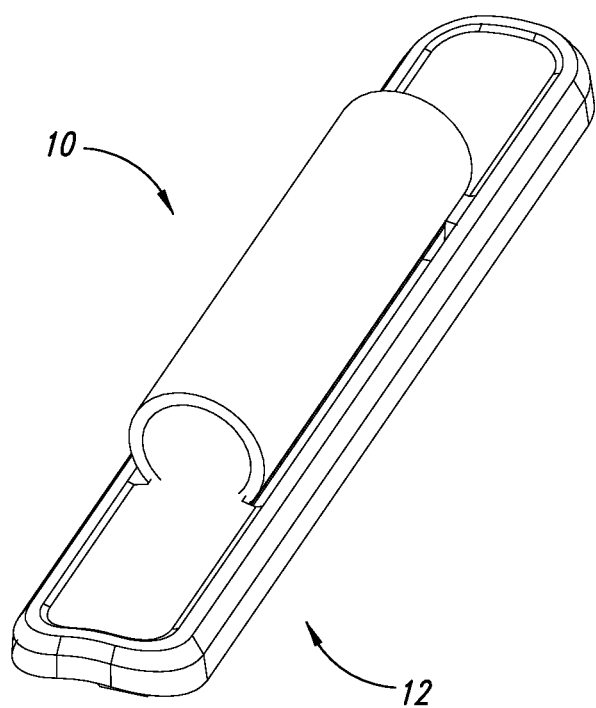
FIG. 16 is an anterior perspective view of tubular member of FIG. 1 being coupled with the frame assembly of FIG. 7.

Turning to FIG. 16, depicted therein is an anterior perspective view of tubular member 10 being coupled with frame assembly 12.

Figure 17:
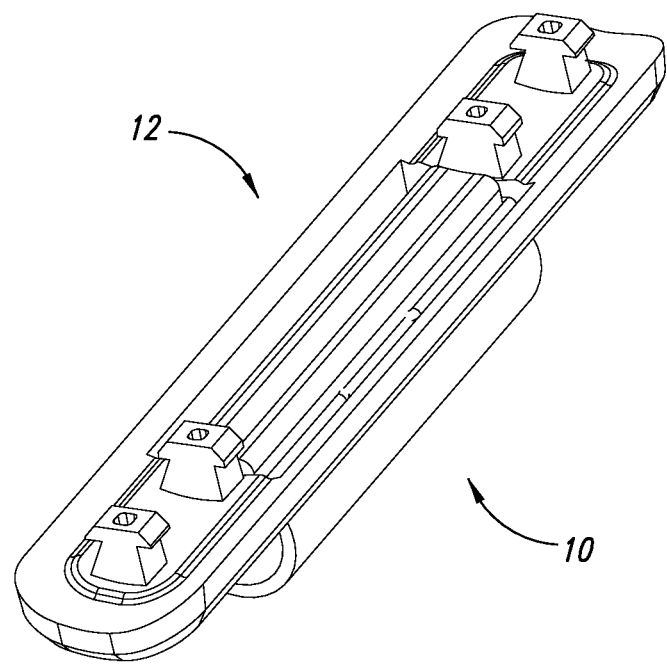
FIG. 17 is a posterior perspective view of tubular member of FIG. 1 being coupled with the frame assembly of FIG. 7.

Turning to FIG. 17, depicted therein is a posterior perspective view of tubular member 10 being coupled with frame assembly 12.

Figure 18:
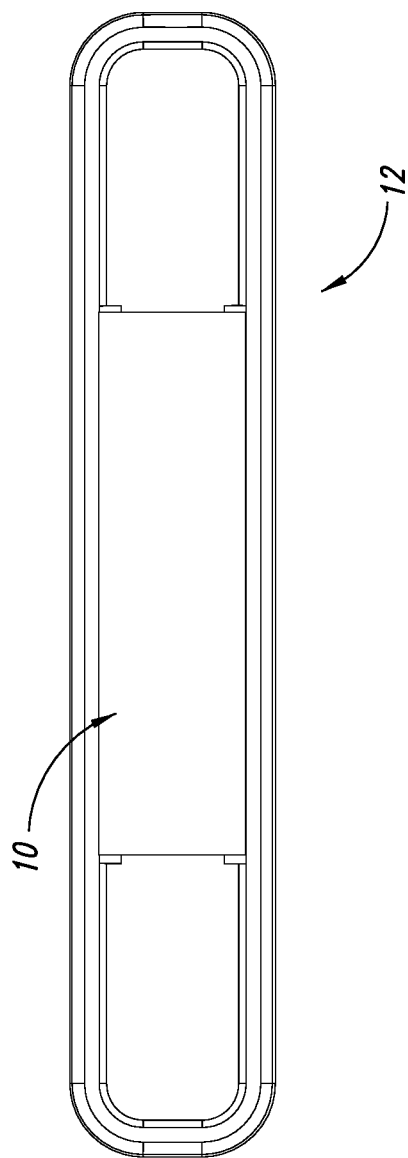
FIG. 18 is a top plan view of tubular member of FIG. 1 being coupled with the frame assembly of FIG. 7.

Turning to FIG. 18, depicted therein is a top plan view of tubular member 10 being coupled with frame assembly 12.

Figure 19:
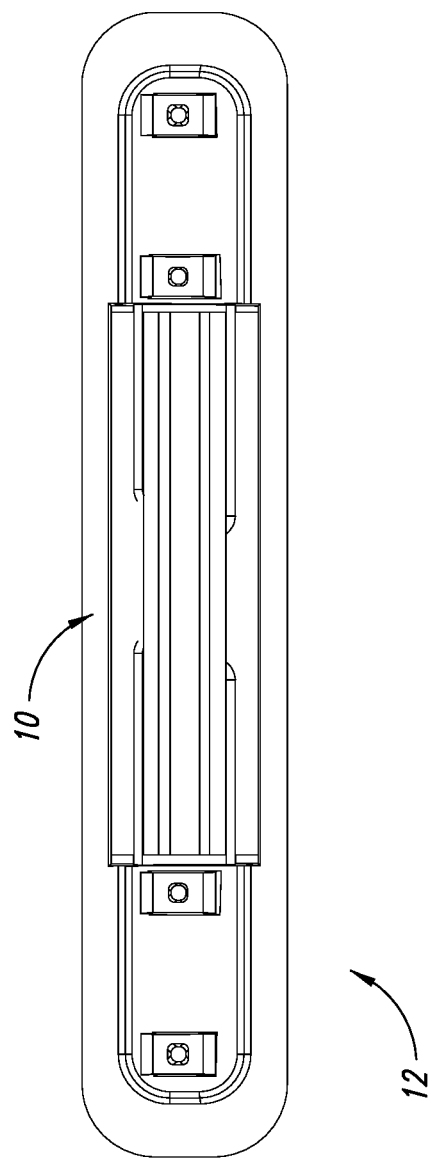
FIG. 19 is a bottom plan view of tubular member of FIG. 1 being coupled with the frame assembly of FIG. 7.

Turning to FIG. 19, depicted therein is a bottom plan view of tubular member 10 being coupled with frame assembly 12.

Turning to FIG. 20, depicted therein is an elevational view of a first end of tubular member 10 being coupled with frame assembly 12.

Turning to FIG. 21, depicted therein is an elevational view of a second end of tubular member 10 being coupled with frame assembly 12.

Turning to FIG. 22, depicted therein is a side-elevational view of tubular member 10 being coupled with frame assembly 12.

Figure 23:
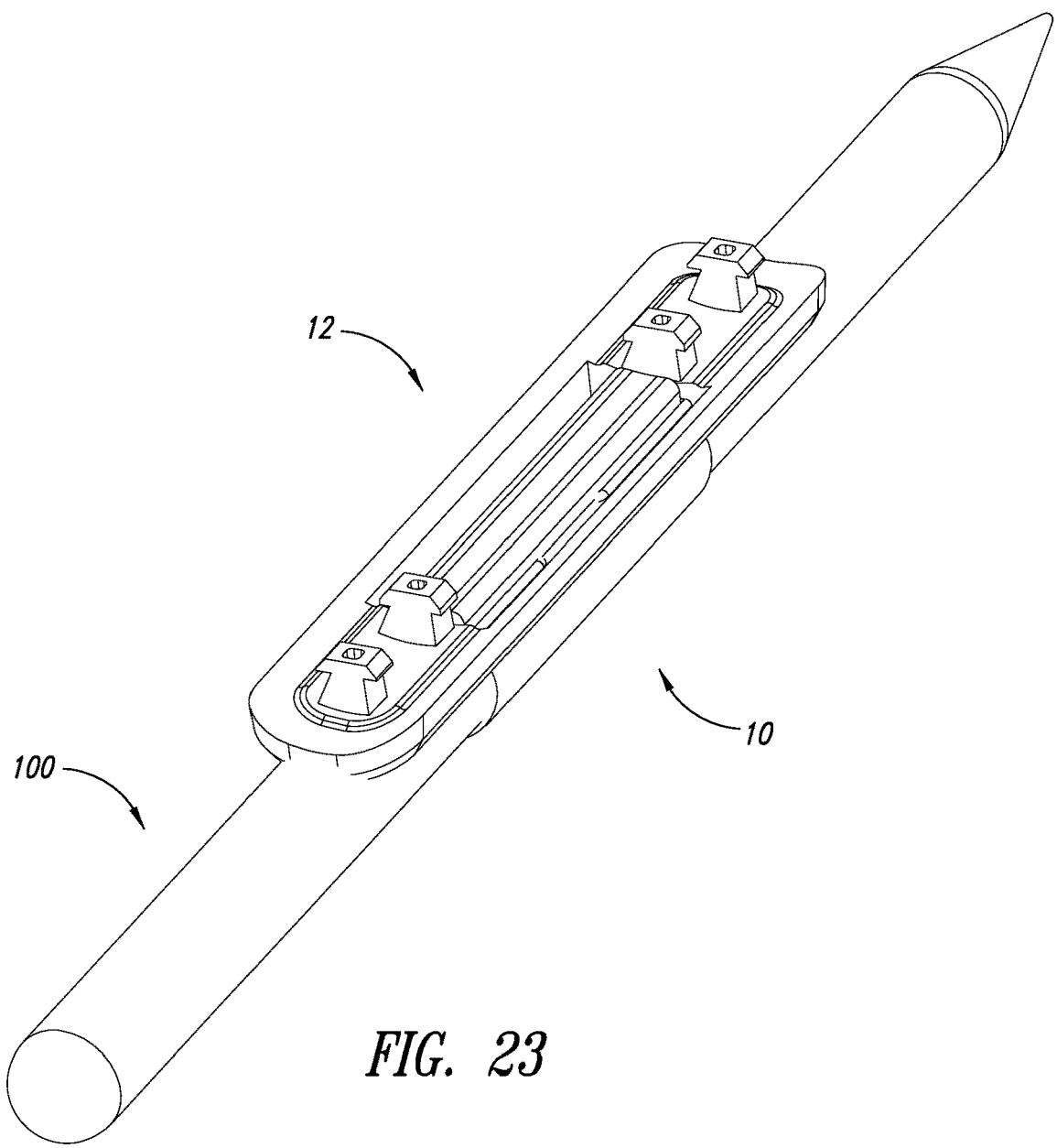
FIG. 23 is a posterior perspective view of tubular member of FIG. 1 being coupled with the frame assembly of FIG. 7 and the tubular member coupled with a stylus-shaped member.

Turning to FIG. 23, depicted therein is a posterior perspective view of tubular member 10 being coupled with frame assembly 12 and tubular member 10 coupled with stylus-shaped member 100.

Figure 24:
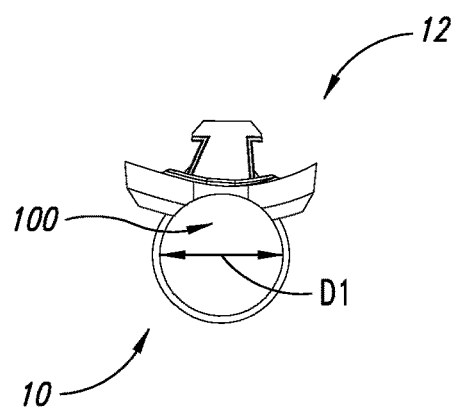
FIG. 24 is an elevational view of a first end of tubular member of FIG. 1 being coupled with the frame assembly of FIG. 7 and the tubular member coupled with the stylus-shaped member of FIG. 23.

Turning to FIG. 24, depicted therein is an elevational view of a first end of tubular member 10 being coupled with frame assembly 12 and tubular member 10 coupled with stylus-shaped member 100 with diameter dimension D1.

Figure 25:
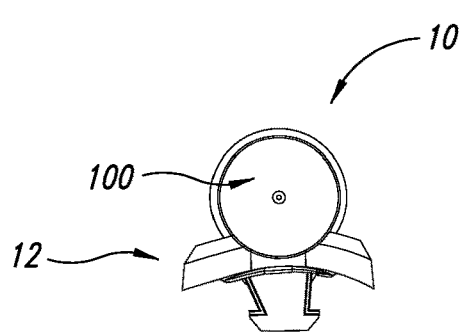
FIG. 25 is an elevational view of a first end of tubular member of FIG. 1 being coupled with the frame assembly of FIG. 7 and the tubular member coupled with the stylus-shaped member of FIG. 23.

Turning to FIG. 25, depicted therein is an elevational view of a first end of tubular member 10 being coupled with frame assembly 12 and tubular member 10 coupled with stylus-shaped member 100.

Figure 26:
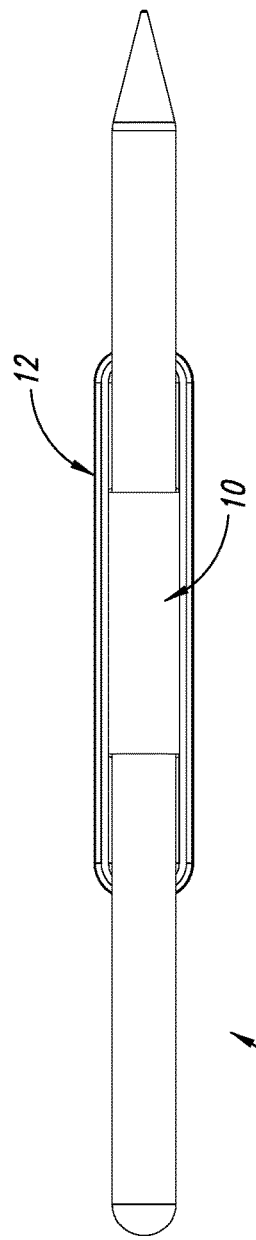
FIG. 26 is a top plan view of tubular member of FIG. 1 being coupled with the frame assembly of FIG. 7 and the tubular member coupled with the stylus-shaped member of FIG. 23.

Turning to FIG. 26, depicted therein is a top plan view of tubular member 10 being coupled with frame assembly 12 and tubular member 10 coupled with stylus-shaped member 100.

Figure 27:
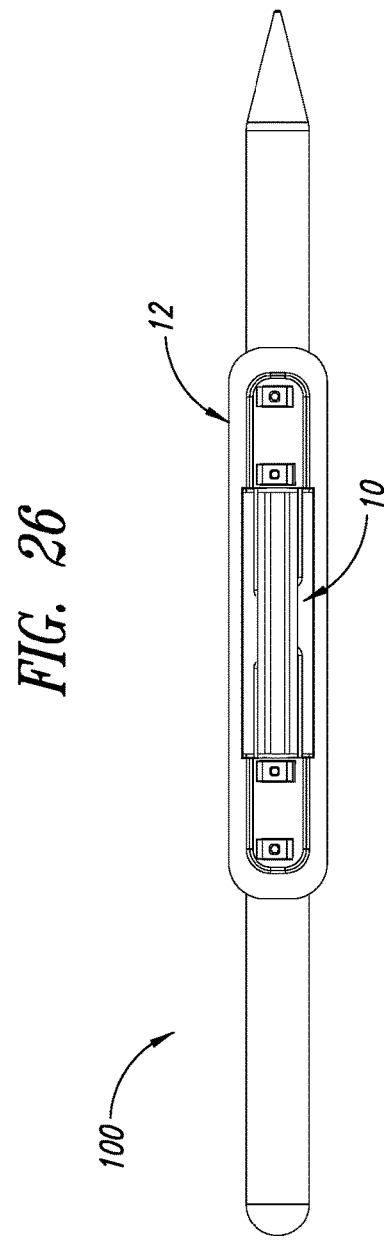
FIG. 27 is a bottom plan view of tubular member of FIG. 1 being coupled with the frame assembly of FIG. 7 and the tubular member coupled with the stylus-shaped member of FIG. 23.

Turning to FIG. 27, depicted therein is a bottom plan view of tubular member 10 being coupled with frame assembly 12 and tubular member 10 coupled with stylus-shaped member 100.

Figure 28:
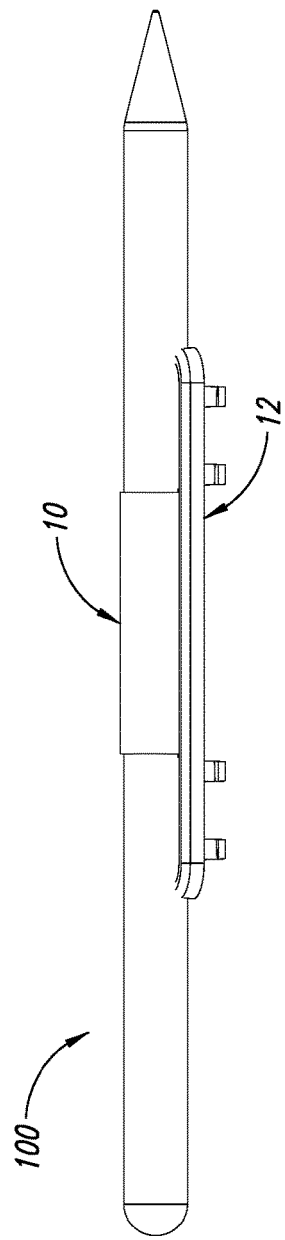
FIG. 28 is a side-elevational view of tubular member of FIG. 1 being coupled with the frame assembly of FIG. 7 and the tubular member coupled with the stylus-shaped member of FIG. 23.

Turning to FIG. 28, depicted therein is a side-elevational view of tubular member 10 being coupled with frame assembly 12 and tubular member 10 coupled with stylus-shaped member 100.

Figure 29A:
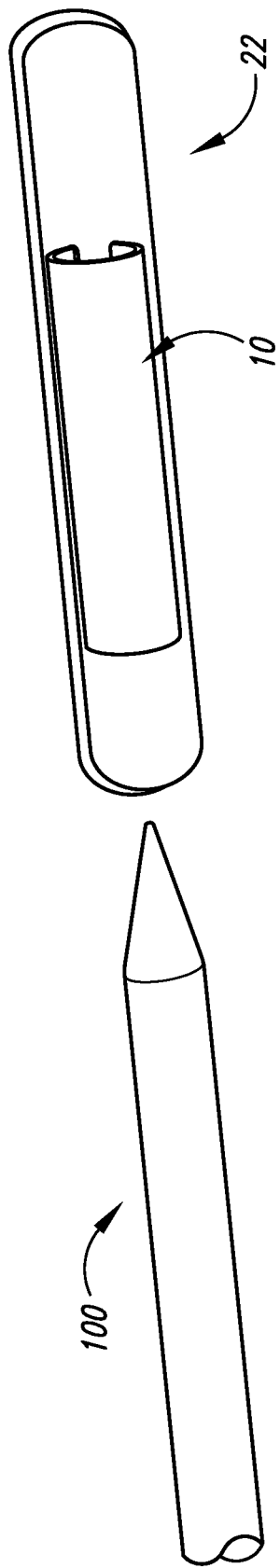
FIG. 29A is a top plan view of tubular member of FIG. 1 being coupled with frame assembly of FIG. 14A and the tubular member before being coupled with the stylus-shaped member of FIG. 23.

Turning to FIG. 29A, depicted therein is a top plan view of tubular member 10 being coupled with frame assembly 22 and tubular member 10 before being coupled with stylus-shaped member 100.

Figure 29B:
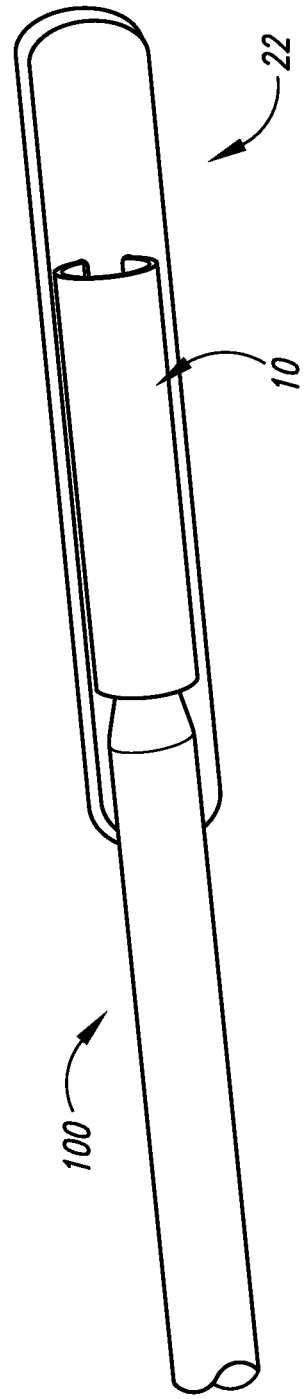
FIG. 29B is a top plan view of tubular member of FIG. 1 being coupled with frame assembly of FIG. 14A and the tubular member initially being coupled with the stylus-shaped member of FIG. 23.

Turning to FIG. 29B, depicted therein is a top plan view of tubular member 10 being coupled with frame assembly 22 and tubular member 10 initially being coupled with stylus-shaped member 100.

Figure 29C:
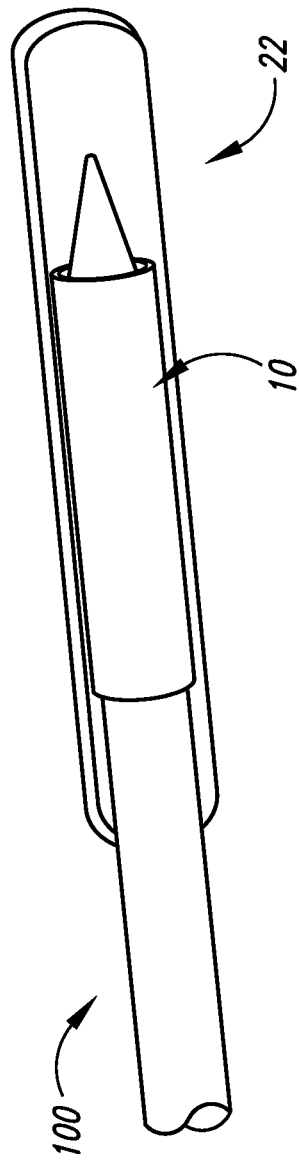
FIG. 29C is a top plan view of tubular member of FIG. 1 being coupled with frame assembly of FIG. 14A and the tubular member further being coupled with the stylus-shaped member of FIG. 23.

Turning to FIG. 29C, depicted therein is a top plan view of tubular member 10 being coupled with frame assembly 22 and tubular member 10 further being coupled with stylus-shaped member 100.

Figure 29D:
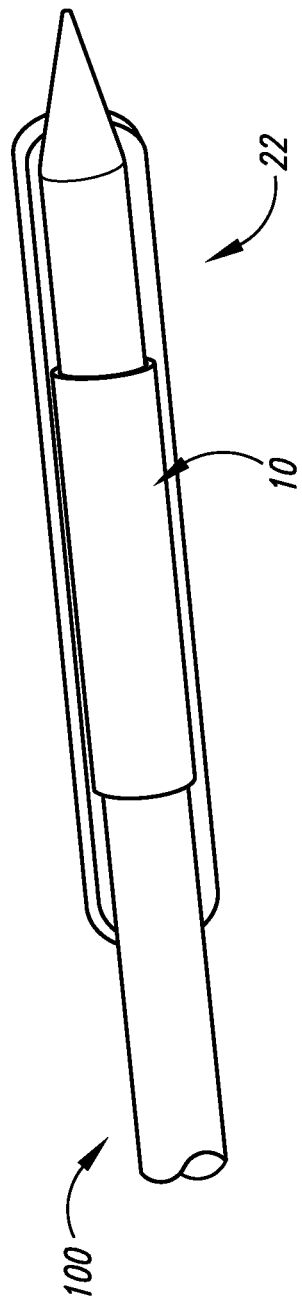
FIG. 29D is a top plan view of tubular member of FIG. 1 being coupled with frame assembly of FIG. 14A and the tubular member still further being coupled with the stylus-shaped member of FIG. 23.

Turning to FIG. 29D, depicted therein is a top plan view of tubular member 10 being coupled with frame assembly 22 and tubular member 10 still further being coupled with stylus-shaped member 100.

Figure 29E:
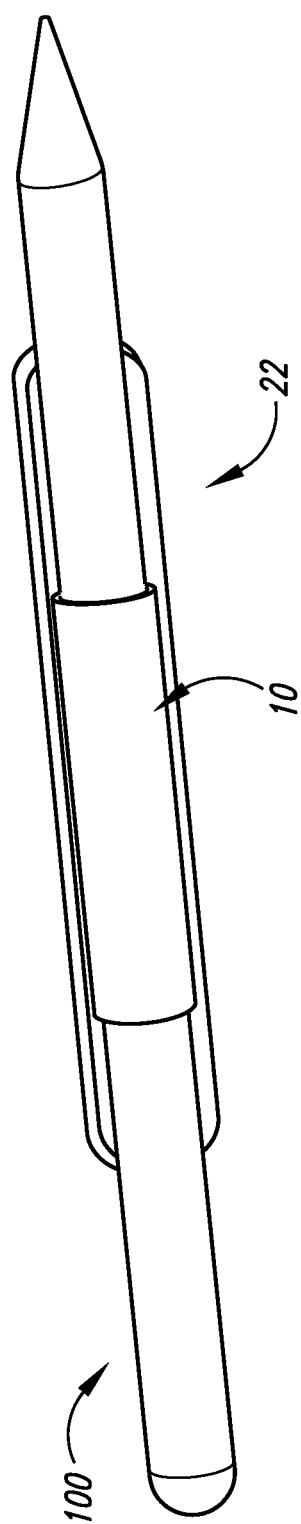
FIG. 29E is a top plan view of tubular member of FIG. 1 being coupled with frame assembly of FIG. 14A and the tubular member being fully coupled with the stylus-shaped member of FIG. 23.

Turning to FIG. 29E, depicted therein is a top plan view of tubular member 10 being coupled with frame assembly 22 and tubular member 10 being fully coupled with stylus-shaped member 100.

Figure 30:
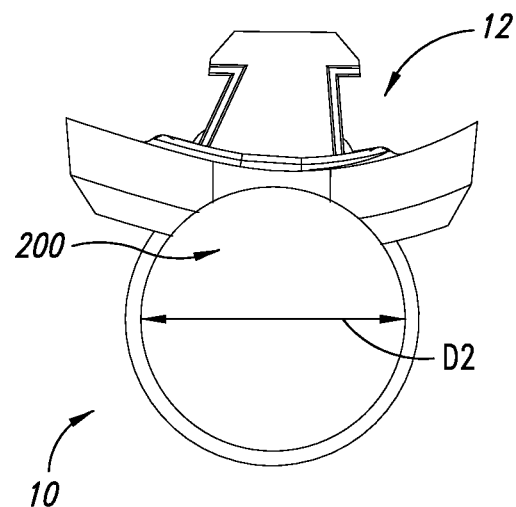
FIG. 30 is an elevational view of a first end of tubular member of FIG. 1 being coupled with the frame assembly of FIG. 7 and the tubular member being fully coupled with a stylus-shaped member.

Turning to FIG. 30, depicted therein is an elevational view of a first end of tubular member 10 being coupled with frame assembly 12 and tubular member 10 being fully coupled with stylus-shaped member 200 having diameter dimension D2.

Figure 31:
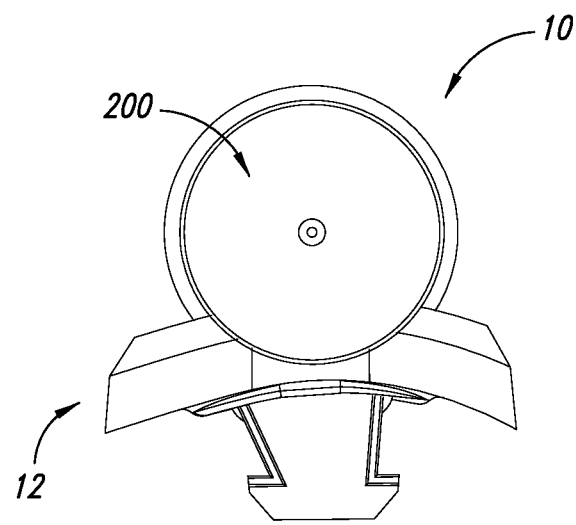
FIG. 31 is an elevational view of a first end of tubular member of FIG. 1 being coupled with the frame assembly of FIG. 7 and the tubular member being fully coupled with the stylus-shaped member of FIG. 30.

Turning to FIG. 31, depicted therein is an elevational view of a first end of tubular member 10 being coupled with frame assembly 12 and tubular member 10 being fully coupled with stylus-shaped member 200.

Figure 32A:
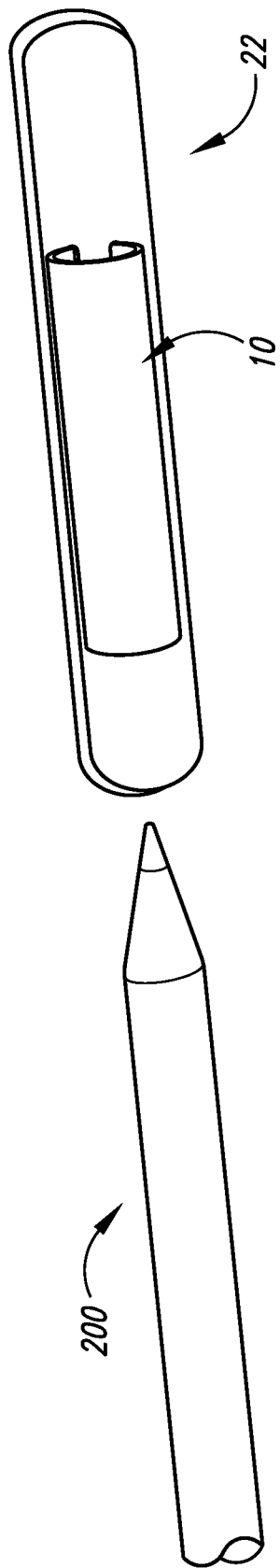
FIG. 32A is a top plan view of tubular member of FIG. 1 being coupled with frame assembly of FIG. 14A and the tubular member before being coupled with the stylus-shaped member of FIG. 30.

Turning to FIG. 32A, depicted therein is a top plan view of tubular member 10 being coupled with frame assembly 22 and tubular member 10 before being coupled with stylus-shaped member 200.

Figure 32B:
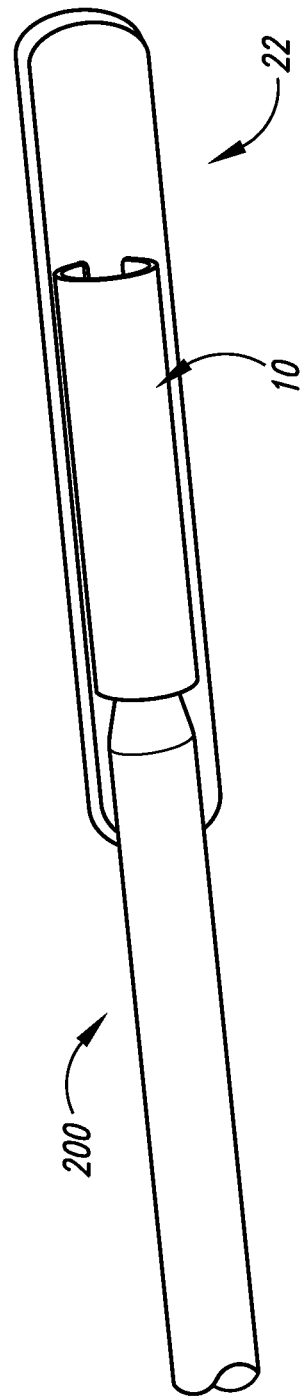
FIG. 32B is a top plan view of tubular member of FIG. 1 being coupled with frame assembly of FIG. 14A and the tubular member initially being coupled with the stylus-shaped member of FIG. 30.

Turning to FIG. 32B, depicted therein is a top plan view of tubular member 10 being coupled with frame assembly 22 and tubular member 10 initially being coupled with stylus-shaped member 200.

Figure 32C:
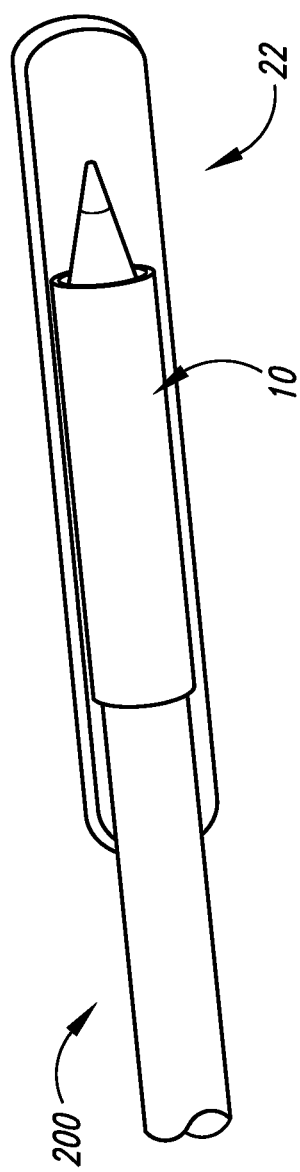
FIG. 32C is a top plan view of tubular member of FIG. 1 being coupled with frame assembly of FIG. 14A and the tubular member further being coupled with the stylus-shaped member of FIG. 30.

Turning to FIG. 32C, depicted therein is a top plan view of tubular member 10 being coupled with frame assembly 22 and tubular member 10 further being coupled with stylus-shaped member 200.

Figure 32D:
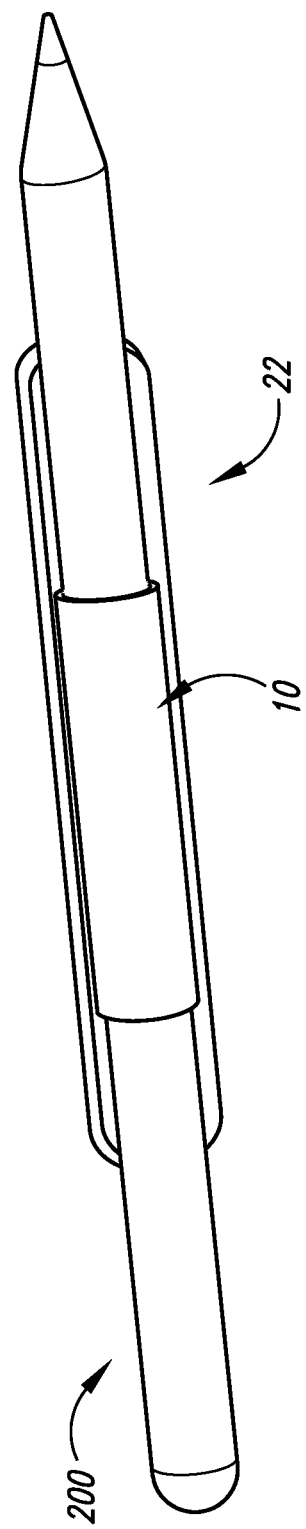
FIG. 32D is a top plan view of tubular member of FIG. 1 being coupled with frame assembly of FIG. 14A and the tubular member being fully coupled with the stylus-shaped member of FIG. 30.

Turning to FIG. 32D, depicted therein is a top plan view of tubular member 10 being coupled with frame assembly 22 and tubular member 10 being fully coupled with stylus-shaped member 200.

Figure 33:
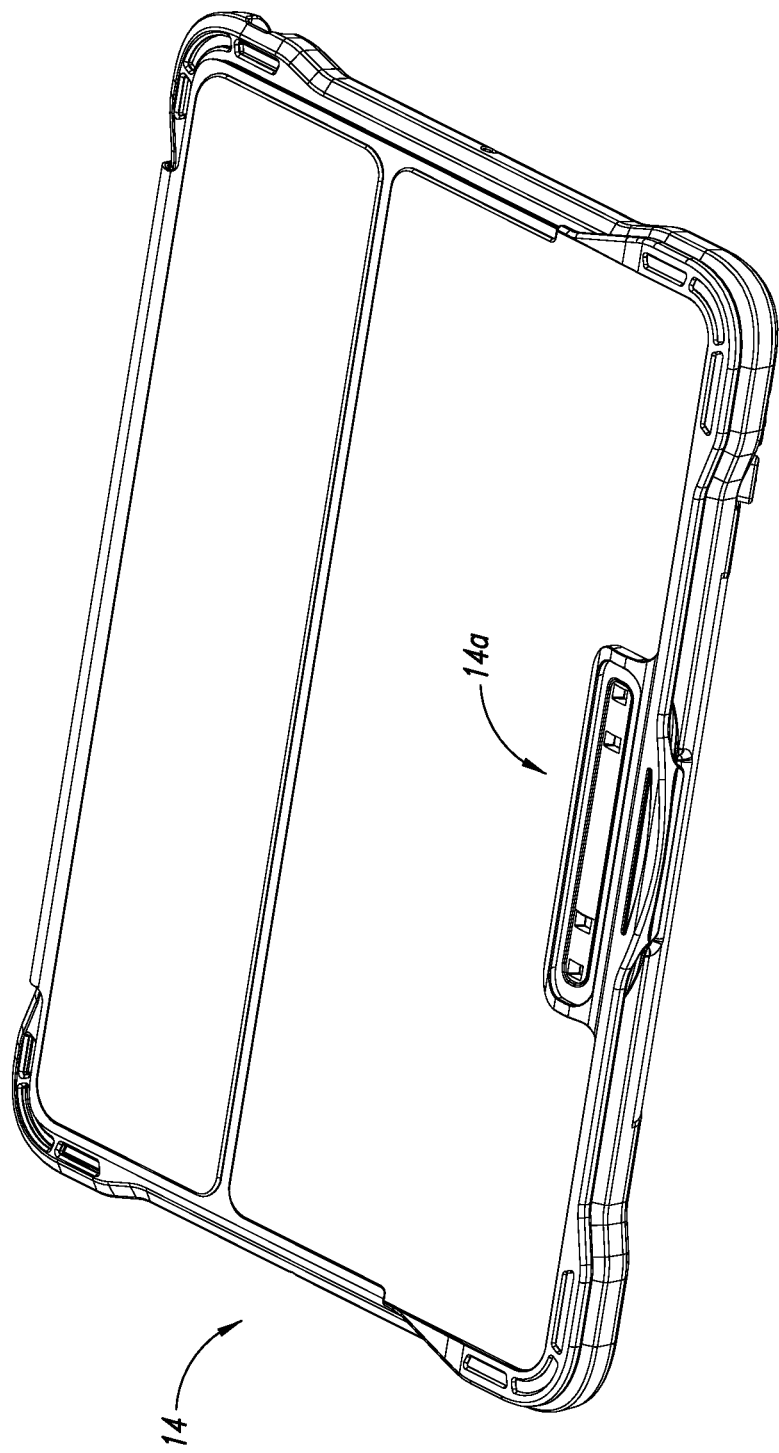
FIG. 33 is an anterior perspective view of a case for a self-contain portable electronic computing device.

Turning to FIG. 33, depicted therein is an anterior perspective view of case 14.

Figure 34:
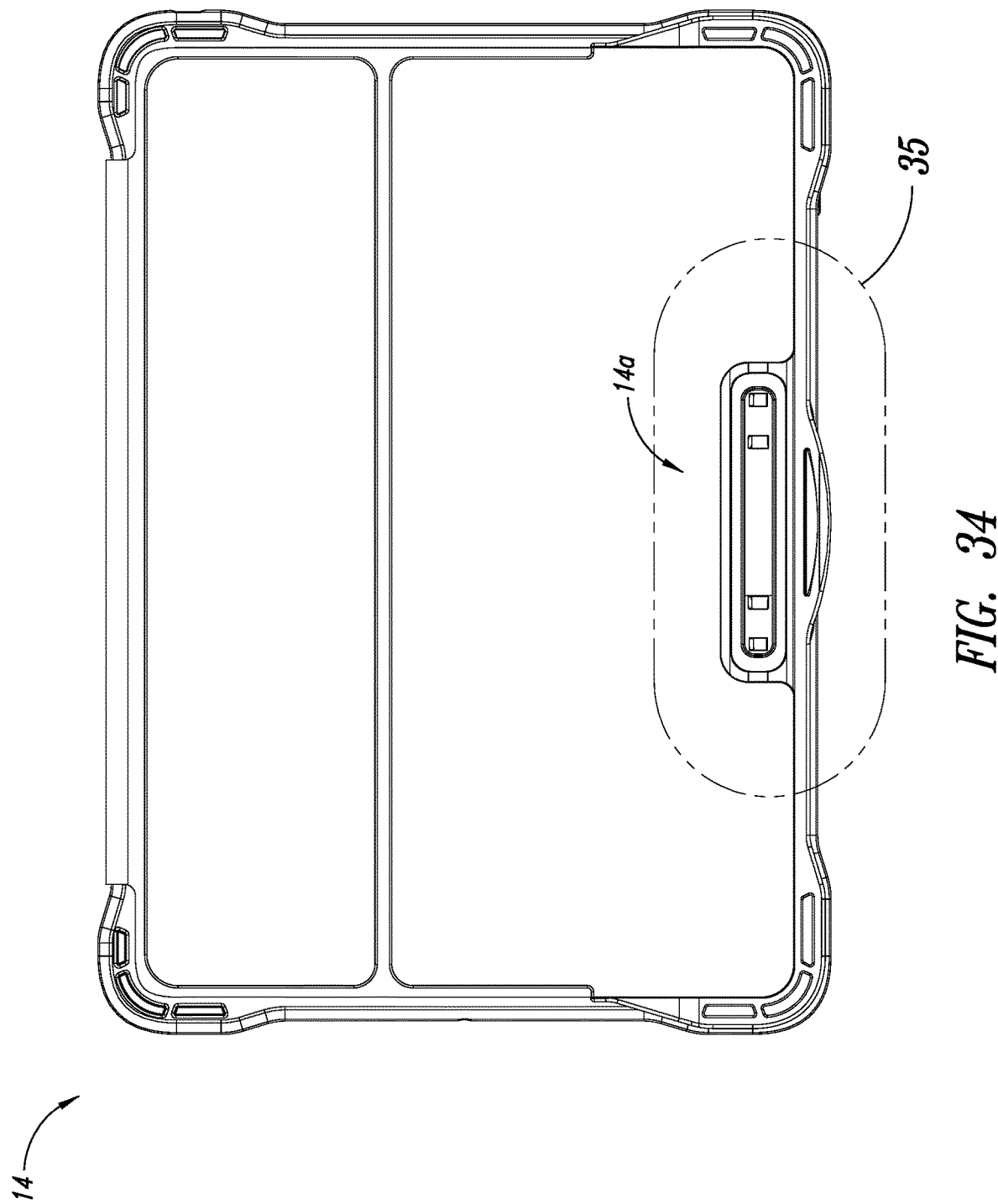
FIG. 34 is a top plan view of the case for a self-contain portable electronic computing device of FIG. 33.

Turning to FIG. 34, depicted therein is a top plan view of case 14.

Figure 35:
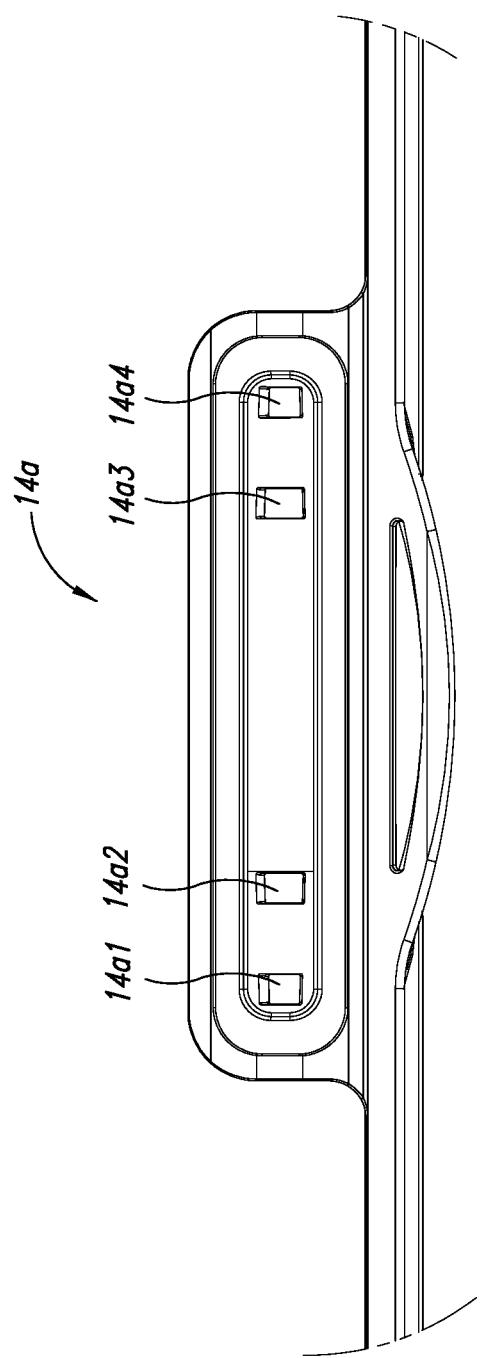
FIG. 35 is a top plan view of a portion identified by dashed-ellipses "35" of the case for a self-contained portable electronic computing device of FIG. 33.

Turning to FIG. 35, depicted therein is a top plan view of a portion identified by dashed-ellipses "35" of case 14.

Figure 36A:
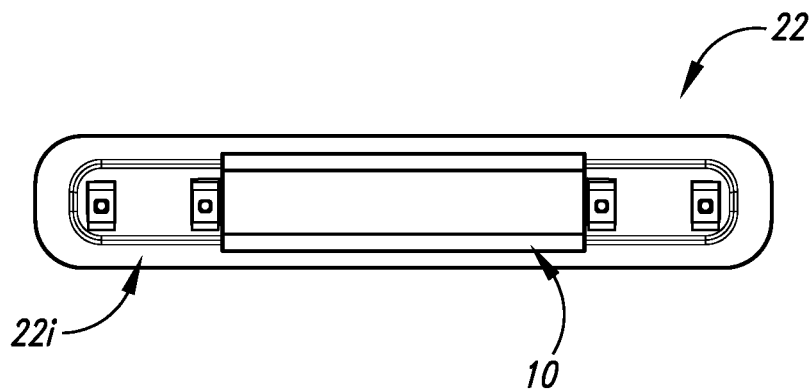
FIG. 36A is a bottom plan view of tubular member of FIG. 1 coupled with frame assembly of FIG. 14A.

Turning to FIG. 36A, depicted therein is a bottom plan view of tubular member 10 coupled with frame assembly 22.

Figure 36B:
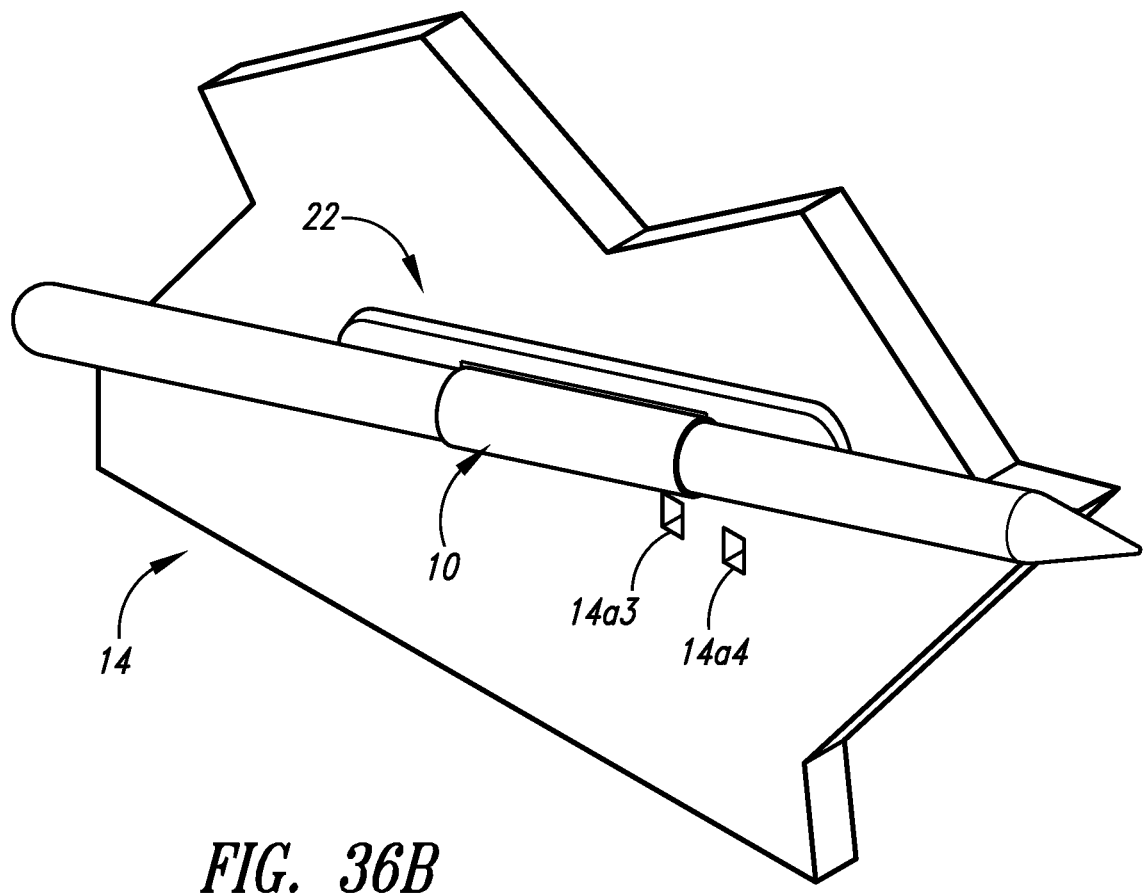
FIG. 36B is a top perspective view of tubular member of FIG. 1 coupled with frame assembly of FIG. 14A and partially coupled with a case for a self-contained portable electronic computing device.

Turning to FIG. 36B, depicted therein is a top perspective view of tubular member 10 coupled with frame assembly 22 and partially coupled with case 14.

Figure 36C:
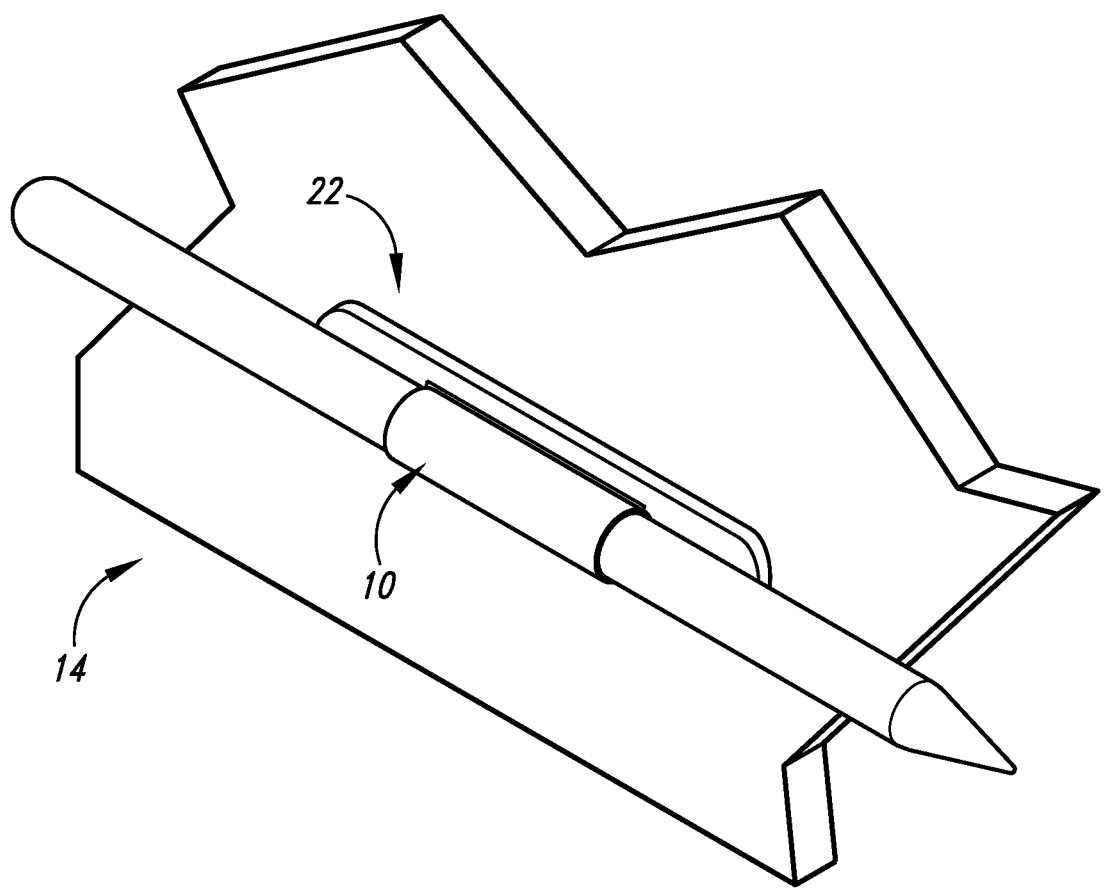
FIG. 36C is a top perspective view of tubular member of FIG. 1 coupled with frame assembly of FIG. 14A and coupled with the case for a self-contained portable electronic computing device of FIG. 36 B.

Turning to FIG. 36C, depicted therein is a top perspective view of tubular member 10 coupled with frame assembly 22 and coupled with case 14.

Turning to FIG. 37, depicted therein is a top plan view of tubular member 10 coupled with frame assembly 12 and coupled with case 14.

Figure 38B:
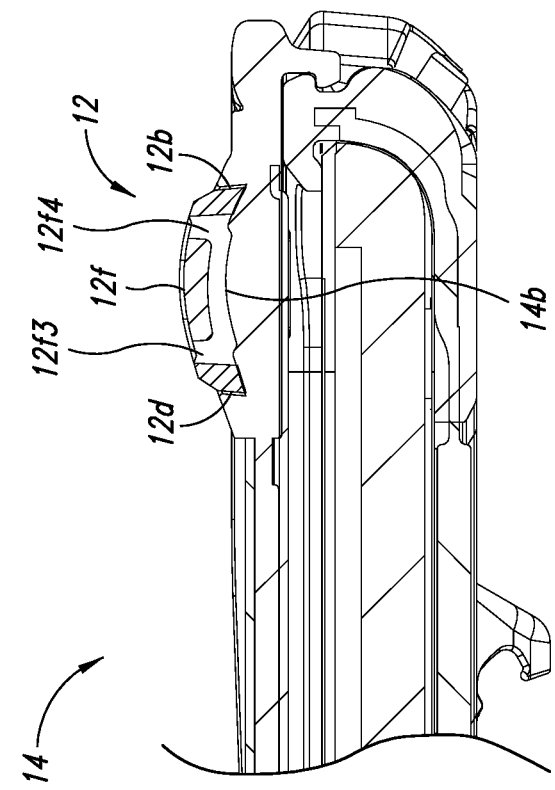
FIG. 38B is an enlarged portion of a cross-sectional view of the frame assembly of FIG. 7 coupled with the case for the self-contained portable electronic computing device of FIG. 37 taken along the cross-sectional 38B-38B line of FIG. 37.
Figure 38A:
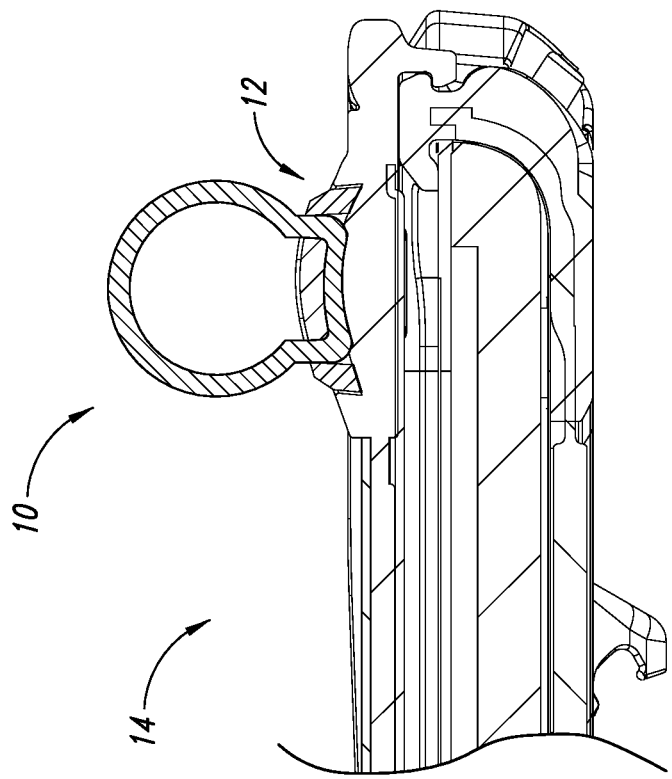
FIG. 38A is an enlarged portion of a cross-sectional view of tubular member of FIG. 1 coupled with the frame assembly of FIG. 7 and coupled with a case for the self-contained portable electronic computing device of FIG. 37 taken along the cross-sectional 38A-38A line of FIG. 37.

Turning to FIG. 38A, depicted therein is an enlarged portion of a cross-sectional view of tubular member 10 coupled with frame assembly 12 and coupled with case 14 taken along the cross-sectional 38A-38A line of FIG. 37.

Turning to FIG. 38B, depicted therein is an enlarged portion of a cross-sectional view of frame assembly 12 coupled with case 14 taken along the cross-sectional 38B-38B line of FIG. 37.

Figure 39:
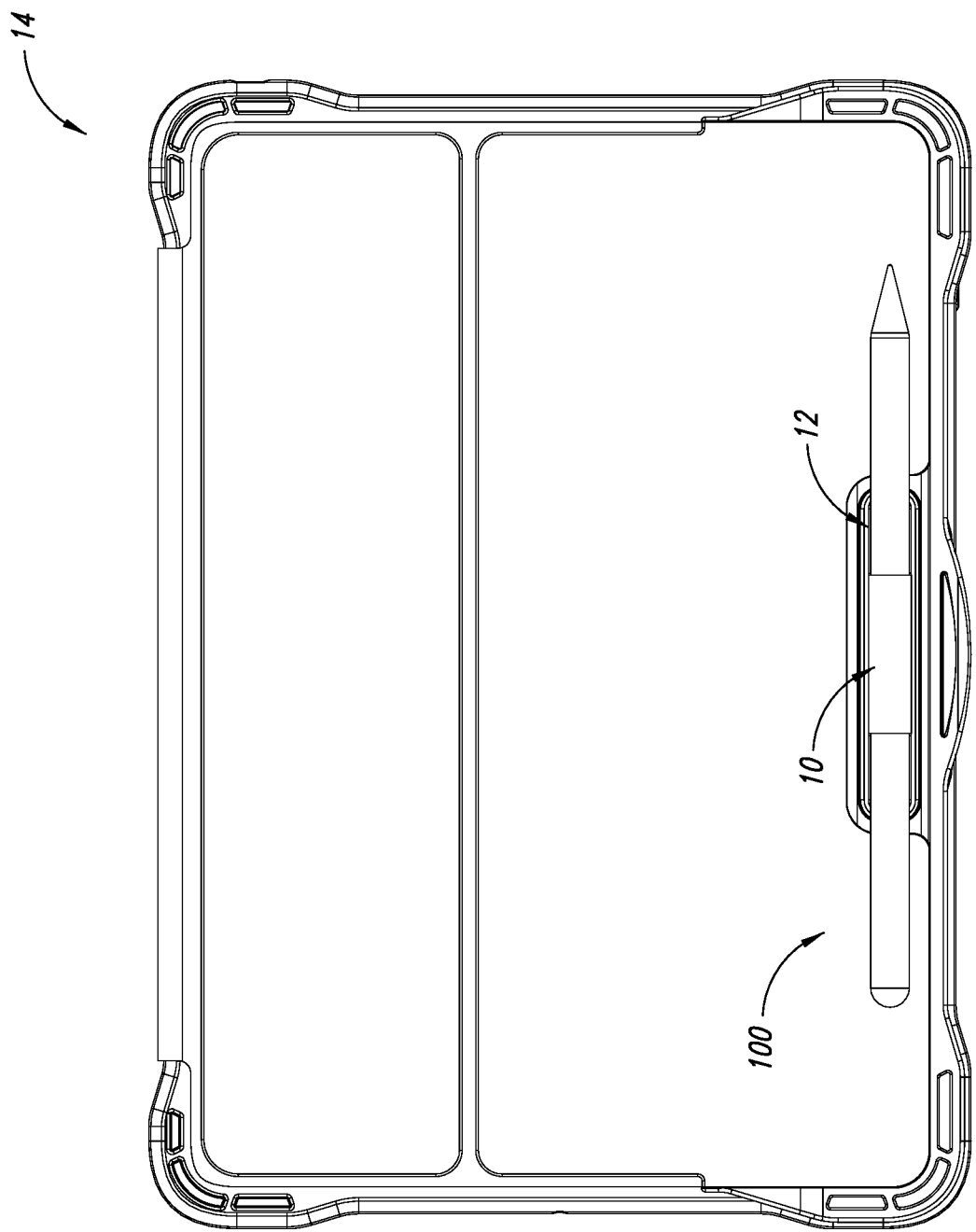
FIG. 39 is a top plan view of tubular member of FIG. 1 coupled with the stylus-shaped member of FIG. 23 and coupled with the frame assembly of FIG. 7 and coupled with the case for a self-contained portable electronic computing device of FIG. 37.

Turning to FIG. 39, depicted therein is a top plan view of tubular member 10 coupled with stylus-shaped member 100 and coupled with frame assembly 12 and coupled with case 14.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system for a self-contained portable electronic computing device and for a stylus-shaped member, the system comprising:
   (I) a case for holding at least one portion of the self-contained portable electronic computing device, the case including at least one aperture;
   (II) a frame assembly including at least one projection, the at least one projection couplable with the at least one aperture of the case; and
   (III) a flexible tubular member removably couplable with the frame assembly, the flexible tubular member for holding at least one portion of the stylus-shaped member wherein the frame assembly includes at least one elongated member sized to receive at least one portion of the flexible tubular member.

2. The system of claim 1 wherein the at least one elongated member includes a cross-sectional profile with a width larger than a thickness.

3. The system of claim 1 wherein the at least one elongated member includes first and second elongated members extending toward one another without contacting each other.

4. The system of claim 1 wherein the at least one elongated member includes first and second elongated members extending toward one another with a gap therebetween.

5. The system of claim 1 wherein the frame assembly includes a first side, a second side and the at least one elongated member includes a first elongated member and a second elongated member, the first side being parallel with the second side, the first elongated member extending from the first side and the second elongated member extending from the second side.

6. The system of claim 1 wherein the flexible tubular member includes a semi-circular portion and a semi-rectangular portion.

7. The system of claim 1 wherein the flexible tubular member includes at least one curvilinear portion and at least one linear portion.

8. The system of claim 7 wherein
   (A) the at least one curvilinear portion of the flexible tubular member includes a first end and a second end,
   (B) the at least one linear portion of the flexible tubular member includes a first side portion, a second side portion, and a third side portion,
   (C) the first side portion extending from the first end of the at least one curvilinear portion,
   (D) the second side portion extending from the second end of the at least one curvilinear portion,
   (E) the first side portion being generally parallel with the second side portion, and
   (F) the third side portion extending between the first side portion and the second side portion.

9. The system of claim 8 wherein
   (A) the at least one elongated member includes a dimensional width, and
   (B) the third side portion of the at least one linear portion of the configurable cross-sectional profile of the flexible tubular member being sized according to the dimensional width of the at least one elongated member.

10. The system of claim 7 wherein
    (A) the frame assembly being coupled to the case for the portable electronic computing device,
    (B) a first portion of the at least one linear portion of the flexible tubular member including an external surface portion and an internal surface portion,
    (C) the external surface portion of the first portion of the at least one linear portion being in contact with a portion of the case for the portable electronic computing device, and
    (D) the internal surface portion of the first portion of the at least one linear portion being in contact with the at least one elongated member of the frame assembly.

11. The system of claim 1 wherein the flexible tubular member includes a length dimension being a first length when a first compressive force on the flexible tubular member along the length dimension is present and being a second length when compressive force on the flexible tubular member along the length dimension is absent, the second length being greater than the first length.

12. The system of claim 1 wherein the flexible tubular member includes a diameter dimension being a first length when a first expansive force on the flexible tubular member along the diameter dimension is present and being a second length when expansive force on the flexible tubular member along the diameter dimension is absent, the first length being greater than the second length.

13. The system of claim 1, wherein the flexible tubular member being made from at least one of the following: at least one polyester material, at least one nylon material, at least one silicone material, and at least one elasticized material.

14. The system of claim 1, wherein the frame assembly being made from at least one of the following: at least one polycarbonate (PC) material, at least one polypropylene (PP) material, and at least one polyethylene (PET) material.

15. A frame assembly for coupling with a case for a self-contained portable electronic computing device, the case including at least one aperture, and for coupling with a flexible tubular member, the frame assembly comprising:
    (I) at least one projection couplable with the at least one aperture of the case;
    (II) a first side;
    (III) a second side parallel with the first side;
    (IV) a first elongated member for coupling with the flexible tubular member, the first elongated member extending from the first side toward the second side; and
    (V) a second elongated member for coupling with the flexible tubular member, the second elongated member extending from the second side toward the first side, wherein the first elongated member and the second elongated member being spaced from each other.

16. The frame assembly of claim 15 wherein the first elongated member includes a cross-sectional profile with a width larger than a thickness.

* * * * *